US012749286B2

(12) United States Patent
Ranasinghe et al.

(10) Patent No.: US 12,749,286 B2
(45) Date of Patent: Sep. 29, 2026

(54) SYSTEM AND METHOD FOR SELF-SUPERVISED VIDEO TRANSFORMER

(71) Applicant: Mohamed bin Zayed University of Artificial Intelligence, Abu Dhabi (AE)

(72) Inventors: Kanchana Ranasinghe, Abu Dhabi (AE); Muhammad Muzammal Naseer, Abu Dhabi (AE); Salman Khan, Abu Dhabi (AE); Fahad Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 492 days.

(21) Appl. No.: 17/991,410

(22) Filed: Nov. 21, 2022

(65) Prior Publication Data

US 2024/0169692 A1 May 23, 2024

(51) Int. Cl.
*G06V 10/74* (2022.01)
*G06V 20/59* (2022.01)
(Continued)

(52) U.S. Cl.
CPC .......... *G06V 10/761* (2022.01); *G06V 20/597* (2022.01); *G06V 40/23* (2022.01); *H04N 19/132* (2014.11)

(58) Field of Classification Search
CPC .... G06V 10/761; G06V 20/597; G06V 40/23; G06V 10/7753; G06V 10/774;
(Continued)

(56) References Cited

U.S. PATENT DOCUMENTS 8,848,802 B2 * 9/2014 Chaudhury .......... H04N 19/159 375/240.25
9,641,729 B2 * 5/2017 Zhang .................. H04N 19/154
(Continued)

FOREIGN PATENT DOCUMENTS

CN 115661454 B * 4/2026
WO WO 2022/104293 A1 5/2022

OTHER PUBLICATIONS

Rui Qian et al. "Controllable Augmentations for Video Representation Learning", Mar. 30, 2022, Cornell University, (Year: 2022).*
(Continued)

*Primary Examiner* — John Villecco
*Assistant Examiner* — Alejandro Hernandez
(74) *Attorney, Agent, or Firm* — Oblon, McClelland, Maier & Neustadt, L.L.P.

(57) ABSTRACT

A system, computer readable medium and method trains a video transformer, using a machine learning engine, for human action recognition in a video. The method includes sampling video clips with varying temporal resolutions in global views and sampling the video clips from different spatiotemporal windows in local views. The machine learning engine is configured to match the global and local views in a framework of student-teacher networks to learn cross-view correspondence between local and global views, and to learn motion correspondence between varying temporal resolutions. The video transformer can output for display video clips in a manner that emphasizes attention to the recognized human action.

20 Claims, 11 Drawing Sheets

(51) Int. Cl.
*G06V 40/20* (2022.01)
*H04N 19/132* (2014.01)

(58) Field of Classification Search
CPC .... G06V 10/7715; G06V 10/82; G06V 20/41; G06V 40/20; G06V 10/62; G06V 10/40; G06V 20/49; G06V 10/764; G06V 10/70; G06V 10/806; G06V 10/77; H04N 19/132; G06N 3/08; G06N 3/084; G06N 3/0455; G06N 3/045; G06N 3/0464; G06N 3/02; G06N 20/00; G06N 3/04; G06F 18/214; G06F 18/21; G06F 16/70; G06T 7/10; G06T 7/0002; G06T 7/20; G06T 7/248
See application file for complete search history.

(56) References Cited

U.S. PATENT DOCUMENTS

| | | | | |
|---|---|---|---|---|
| 9,860,551 | B2 * | 1/2018 | Park | H04N 19/167 |
| 10,701,394 | B1 * | 6/2020 | Caballero | G06N 3/045 |
| 10,812,823 | B2 * | 10/2020 | Leontaris | H04N 19/196 |
| 11,166,040 | B2 * | 11/2021 | Ko | H04N 19/513 |
| 11,265,540 | B2 * | 3/2022 | Na | G06N 3/045 |
| 11,380,100 | B2 * | 7/2022 | Lee | G06V 40/23 |
| 11,521,388 | B2 * | 12/2022 | Ueda | G06T 7/292 |
| 11,810,350 | B2 * | 11/2023 | Xiong | G08B 13/19671 |
| 12,114,008 | B2 * | 10/2024 | Sim | H04N 19/117 |
| 12,141,981 | B2 * | 11/2024 | Zhang | G06T 7/174 |
| 12,177,474 | B2 * | 12/2024 | Chen | H04N 19/52 |
| 12,221,111 | B2 * | 2/2025 | Hioki | B60W 50/10 |
| 2009/0060359 | A1 * | 3/2009 | Kim | H04N 19/51<br>382/236 |
| 2011/0058609 | A1 * | 3/2011 | Chaudhury | G06T 7/215<br>375/E7.076 |
| 2013/0301732 | A1 * | 11/2013 | Hsu | H04N 19/105<br>375/240.16 |
| 2014/0348231 | A1 * | 11/2014 | Chaudhury | H04N 19/587<br>375/240.08 |
| 2019/0087661 | A1 * | 3/2019 | Lee | G06N 20/00 |
| 2020/0021841 | A1 * | 1/2020 | Leontaris | H04N 19/105 |
| 2020/0104588 | A1 * | 4/2020 | Annunziata | G06F 18/214 |
| 2021/0021823 | A1 * | 1/2021 | Na | H04N 19/124 |
| 2021/0150220 | A1 * | 5/2021 | Ueda | G06V 20/42 |
| 2022/0086469 | A1 * | 3/2022 | Sarwer | H04N 19/30 |
| 2022/0253977 | A1 * | 8/2022 | Lyu | G06T 7/40 |
| 2022/0374635 | A1 * | 11/2022 | Xiong | G08B 13/19608 |
| 2023/0007914 | A1 * | 1/2023 | Felleisen | B60R 21/015 |
| 2023/0298307 | A1 * | 9/2023 | Mao | G06V 10/751<br>382/155 |
| 2023/0306600 | A1 * | 9/2023 | Zhang | G06T 7/11 |
| 2023/0368531 | A1 * | 11/2023 | Soares | G06V 20/44 |
| 2024/0046606 | A1 * | 2/2024 | Li | G06V 20/41 |
| 2024/0073444 | A1 * | 2/2024 | Han | H04N 19/523 |
| 2025/0016365 | A1 * | 1/2025 | Sim | H04N 19/70 |
| 2025/0063191 | A1 * | 2/2025 | Chen | H04N 19/573 |
| 2025/0148791 | A1 * | 5/2025 | Liu | G06V 10/94 |
| 2025/0254299 | A1 * | 8/2025 | Sun | H04N 19/132 |

OTHER PUBLICATIONS

Jiarui Bi et al. "Transformer in Computer Vision", Sep. 24, 2021, IEEE (Year: 2021).*

Hanting Chen et al. "Learning Student Networks via Feature Embedding", Jan. 2021, IEEE (Year: 2021).*

Michael S. Ryoo et al. "Self-supervised Video Transformer", Jun. 18, 2022, IEEE (Year: 2022).*

Hanbo; Wu et al. "Transformer-based multiview spatiotemporal feature interactive fusion for human action recognition in depth videos", Elsevier Feb. 2025 (Year: 2025).*

Mathilde Caron, et al., "Emerging Properties in Self-Supervised Vision Transformers", Proceedings of the IEEE/CVF International Conference on Computer Vision (ICCV), arXiv:2104.14294v2 [cs. CV], May 24, 2021, 21 pages.

R Devon Hjelm, et al., "Learning Deep Representations by Mutual Information Estimation and Maximization", International Conference for Learning Representations (ICLR), arXiv:1808.06670v5 [stat.ML], Feb. 22, 2019, pp. 1-24.

* cited by examiner

800

SYSTEM AND METHOD FOR SELF-SUPERVISED VIDEO TRANSFORMER

STATEMENT REGARDING PRIOR DISCLOSURE BY THE INVENTORS

Aspects of this technology are described in Ranasinghe, Kanchana, Muzammal Naseer, Salman Khan, Fahad Shahbaz Khan, and Michael S. Ryoo. "Self-supervised video transformer." In *Proceedings of the IEEE/CVF Conference on Computer Vision and Pattern Recognition,* pp. 2874-2884. 2022. arxiv.org/abs/2112.01514, and is incorporated herein by reference in its entirety. Code is available at git.io/J1juJ.

BACKGROUND

Technical Field

The present disclosure is directed to self-supervised training for video transformers, particularly for action recognition.

Description of the Related Art

Human action recognition includes the detection of a human action in a still image or in a video. The action can involve several people, interaction between people, and/or interaction between a person and an object. The human action can also involve a person and an animal. Most human actions in human action recognition involve motion that varies in time and space, referred to as spatiotemporal. Applications that can use human action recognition include video surveillance and home monitoring, video storge and retrieval, and identity recognition. These applications can include specific aspects of human detection in video, human pose estimation, and human tracking. Human action recognition that involves interaction between people or interaction between a person and an object is referred to as interaction recognition.

Interaction between humans and objects is complicated by variations in space and time for a particular action. A handshake is not a motion sequence that is substantially the same for different people. A handshake can involve different speeds, different angles, and different perspectives, even for a handshake between the same two people at different instances. In a similar manner, a person kicking a ball can involving different kicking speeds, different kicking angles, and different perspective views.

Vision classification tasks are performed using images. An image is generally broken up into patches for training a neural network. A neural network architecture that has been used for image classification is a convolution neural network (CNN) which fundamentally is based on human vision. Natural language processing (NLP) has recently adapted a neural network architecture referred to as a transformer, which has shown great success. The success of the transformer architecture for natural language processing has led to work in applying transformers to machine vision.

Since the initial success of transformers in natural language processing (NLP) tasks, they have emerged as a competitive architecture for various other domains. See Jacob Devlin, Ming-Wei Chang, Kenton Lee, and Kristina Toutanova. Bert: Pre-training of deep bidirectional transformers for language understanding. *ArXiv preprint,* 2018; Ashish Vaswani, Noam Shazeer, Niki Parmar, Jakob Uszkoreit, Llion Jones, Aidan N Gomez, Lukasz Kaiser, and Illia Polosukhin. Attention is all you need. *NeurIPS,* 2017; and Salman Khan, Muzammal Naseer, Munawar Hayat, Syed Waqas Zamir, Fahad Shahbaz Khan, and Mubarak Shah. Transformers in vision: A survey. *ArXiv preprint,* 2021, each incorporated herein by reference in their entirety. Among vision tasks, the initial works focused on a combination of convolutional and self-attention based architectures. See Nicolas Carton, Francisco Massa, Gabriel Synnaeve, Nicolas Usunier, Alexander Kirillov, and Sergey Zagoruyko. End-to-end object detection with transformers. In *ECCV,* 2020; Xiaolong Wang, Ross Girshick, Abhinav Gupta, and Kaiming He. Non-local neural networks. In *Proceedings of the IEEE conference on computer vision and pattern recognition,* pages 7794-7803, 2018; YuqingWang, Zhaoliang Xu, XinlongWang, Chunhua Shen, Baoshan Cheng, Hao Shen, and Huaxia Xia. End-to-end video instance segmentation with transformers. *ArXiv preprint,* 2020; and Li Zhang, Dan Xu, Anurag Arnab, and Philip HS Torr. Dynamic graph message passing networks. In *CVPR,* 2020, each incorporated herein by reference in their entirety. A convolution free variant, referred to as vision transformer (ViT), achieved competitive performance on image classification tasks. See Dosovitskiy et al. (2021). While earlier works proposing ViT depended on large-scale datasets, more recent efforts achieve similar results with medium-scale datasets using various augmentation strategies. See Dosovitskiy et al. (2021); Andreas Steiner, Alexander Kolesnikov, Xiaohua Zhai, Ross Wightman, Jakob Uszkoreit, and Lucas Beyer. How to train your vit? data, augmentation, and regularization in vision transformers. *ArXiv preprint,* 2021; and Hugo Touvron, Matthieu Cord, Matthijs Douze, Francisco Massa, Alexandre Sablayrolles, and Herve Jegou. Training data-efficient image transformers and distillation through attention. In *ICML,* 2021, each incorporated herein by reference in their entirety. Other recent architectures also explore improving computational efficiency of ViTs by focusing on transformer blocks. See Ze Liu, Yutong Lin, Yue Cao, Han Hu, Yixuan Wei, Zheng Zhang, Stephen Lin, and Baining Guo. Swin transformer: Hierarchical vision transformer using shifted windows. *ArXiv preprint,* 2021; and Michael S. Ryoo, A. J. Piergiovanni, Anurag Arnab, Mostafa Dehghani, and Anelia Angelova. Tokenlearner: What can 8 learned tokens do for images and videos? *ArXiv preprint,* 2021, each incorporated herein by reference in their entirety.

A vision transformer architecture, referred to as TimeSformer, has also been adopted for video classification tasks. See Arnab et al.; Bertasius et al.; Fan et al. (2021); Ryoo et al.; and Sharir et al.

Self-supervised learning is a type of approach that alleviates some of the work in adding labels to training data. In contrast, supervised learning requires training with labeled data. Self-supervised learning generally includes two steps. In a first step, pseudo-labels are used to train a network to initialize weights. In a second step, a task is performed with supervised learning to obtain a trained neural network model. Self-supervised learning has been applied to images. Early image-based self-supervised learning work focused on pretext tasks that require useful representations to solve. See Carl Doersch, Abhinav Gupta, and Alexei A Efros. Unsupervised visual representation learning by context prediction. In *ICCV,* 2015; Carl Doersch and Andrew Zisserman. Multi-task self-supervised visual learning. In *ICCV,* 2017; Nikos Komodakis and Spyros Gidaris. Unsupervised representation learning by predicting image rotations. In *ICLR,* 2018; Mehdi Noroozi and Paolo Favaro. Unsupervised learning of visual representations by solving jigsaw puzzles. In *ECCV,* 2016; Deepak Pathak, Philipp Krahenbuhl, Jeff Donahue, Trevor Darrell, and Alexei A Efros. Context encoders: Feature learning by inpainting. In *CVPR,* 2016; Pascal Vincent, Hugo Larochelle, Yoshua Bengio, and Pierre-Antoine Manzagol. Extracting and composing robust features with denoising autoencoders. In *ICML,* 2008; and Richard Zhang, Phillip Isola, and Alexei A Efros. Colorful image colorization. In ECCV, 2016, each incorporated herein by reference in their entirety. However, recently contrastive methods have dominated self-supervised learning. See Philip Bachman, R Devon Hjelm, and William Buchwalter. Learning representations by maximizing mutual information across views. In *NeurIPS,* 2019; Caron et al. (2021); Ting Chen et al.; Xinlei Chen, Haoqi Fan, Ross Girshick, and Kaiming He. Improved baselines with momentum contrastive learning. *ArXiv preprint,* 2020; Xinlei Chen, Saining Xie, and Kaiming He. An empirical study of training self-supervised visual transformers. *ArXiv preprint,* 2021; Alexey Dosovitskiy, Jost Tobias Springenberg, Martin Riedmiller, and Thomas Brox. Discriminative unsupervised feature learning with convolutional neural networks. In *NeurIPS,* 2014; He et al.; Olivier J Hénaff, Ali Razavi, Carl Doersch, SM Eslami, and Aaron van den Oord. Data-efficient image recognition with contrastive predictive coding. In *ICML,* 2020; Phuc H Le-Khac, Graham Healy, and Alan F Smeaton. Contrastive representation learning: A framework and review. *IEEE Access,* 2020; Ishan Misra and Laurens van der Maaten. Self-supervised learning of pretext-invariant representations. In *CVPR,* 2020; Yonglong Tian, Dilip Krishnan, and Phillip Isola. Contrastive multiview coding. *ECCV,* 2020; and Yonglong Tian, Chen Sun, Ben Poole, Dilip Krishnan, Cordelia Schmid, and Phillip Isola. What makes for good views for contrastive learning. In *NeurIPS,* 2020, each incorporated herein by reference in their entirety. These approaches generally consider two views of a single sample (transformed through augmentations) and pull them (positives) together while pushing away from all other (negative) samples in representation space. See Bachman et al.; and Aaron van den Oord, Yazhe Li, and Oriol Vinyals. Representation learning with contrastive predictive coding. *NeurIPS,* 2018, each incorporated herein by reference in their entirety. Key drawbacks of these methods are the necessity for careful mining of positive/negative samples and reliance on large numbers of negative samples (leading to large batch sizes or memory banks). See Yonglong et al. in *NeurIPS* (2020); Ting Chen et al.; and He et al. While clustering methods improve on this using cluster targets, recent regression based methods that predict alternate representations eliminate the need for sample mining and negative samples. See Humam Alwassel, Dhruv Mahajan, Lorenzo Torresani, Bernard Ghanem, and Du Tran. Self-supervised learning by cross-modal audio-video clustering. In *NeurIPS,* 2020; Yuki Markus Asano, Christian Rupprecht, and Andrea Vedaldi. Self-labelling via simultaneous clustering and representation learning. In *ICLR,* 2020; Miguel A. Bautista, Artsiom Sanakoyeu, Ekaterina Sutter, and Bjorn Ommer. Cliquecnn: Deep unsupervised exemplar learning. In *NeurIPS,* 2016; Caron et al. (2019); Caron et al. (2020); Jiabo Huang, Qi Dong, Shaogang Gong, and Xiatian Zhu. Unsupervised deep learning by neighbourhood discovery. In *ICML,* 2019; Kai Tian, Shuigeng Zhou, and Jihong Guan. Deepcluster: A general clustering framework based on deep learning. In *ECML/PKDD,* 2017; Xie et al.; and Grill et al., each incorporated herein by reference in their entirety. In particular, Caron et al. (2021) explores predicting spatially local-global correspondences with ViT backbones within the image domain.

Self-supervised learning has also been applied to videos. While self-supervised learning in videos was initially dominated by approaches based on pretext tasks unique to the video domain, recent work uses contrastive losses, which is similar to the image domain. See Pulkit Agrawal, Joao Carreira, and Jitendra Malik. Learning to see by moving. In *ICCV,* 2015; Ross Goroshin, Joan Bruna, Jonathan Tompson, David Eigen, and Yann LeCun. Unsupervised learning of spatiotemporally coherent metrics. In *ICCV,* 2015; Phillip Isola, Daniel Zoran, Dilip Krishnan, and Edward H. Adelson. Learning visual groups from co-occurrences in space and time. 2016; Michael Mathieu, Camille Couprie, and Yann LeCun. Deep multi-scale video prediction beyond mean square error. In *ICLR,* 2016; Ishan Misra, C. Lawrence Zitnick, and Martial Hebert. Shuffle and learn: Unsupervised learning using temporal order verification. In *ECCV,* 2016; Viorica Pătrăucean, Ankur Handa, and Roberto Cipolla. Spatio-temporal video autoencoder with differentiable memory. In *ICLR* (*Workshop*), 2016; Nitish Srivastava, Elman Mansimov, and Ruslan Salakhudinov. Unsupervised learning of video representations using lstms. In *ICML,* 2015; Carl Vondrick, Hamed Pirsiavash, and Antonio Torralba. Generating videos with scene dynamics. In *NeurIPS,* 2016; Carl Vondrick, Abhinav Shrivastava, Alireza Fathi, Sergio Guadarrama, and Kevin Murphy. Tracking emerges by colorizing videos. In *ECCV,* 2018; Jacob Walker, Carl Doersch, Abhinav Gupta, and Martial Hebert. An uncertain future: Forecasting from static images using variational autoencoders. In *ECCV,* 2016; Xiaolong Wang and Abhinav Gupta. Unsupervised learning of visual representations using videos. In *ICCV;* R Devon et al. Representation learning with video deep infomax. *ArXiv preprint,* 2020; Christoph Feichtenhofer, Haoqi Fan, Bo Xiong, Ross Girshick, and Kaiming He. A large-scale study on unsupervised spatiotemporal representation learning. *ArXiv preprint,* 2021; Tengda Han, Weidi Xie, and Andrew Zisserman. Video representation learning by dense predictive coding. In *ICCV,* 2019; Tengda Han, Weidi Xie, and Andrew Zisserman. Self-supervised co-training for video representation learning. *NeurIPS,* 2020; Qian et al; and Recasens et al., each incorporated herein by reference in their entirety. A combination of previous pretext tasks over multiple modalities with cross-modality distillation is presented in Peirgiovanni et al.; SVT differs in how our self-distillation operates within a single modality and network. The idea of varying resolution along temporal dimension is explored. See Peihao Chen, Deng Huang, Dongliang He, Xiang Long, Runhao Zeng, Shilei Wen, Mingkui Tan, and Chuang Gan. Rspnet: Relative speed perception for unsupervised video representation learning. In *AAAI,* volume 1, 2021; and Deng Huang et al., each incorporated herein by reference in their entirety. These approaches use contrastive losses between different videos at same resolution for speed consistency or the same video at different resolutions for appearance consistency. The idea of views with limited locality is also explored. See Nadine Behrmann, Mohsen Fayyaz, Juergen Gall, and Mehdi Noroozi. Long short view feature decomposition via contrastive video representation learning. In *ICCV,* 2021; Ishan Rajendra Dave, Rohit Gupta, Mamshad Nayeem Rizve, and Mubarak Shah. TCLR: Temporal contrastive learning for video representation. *ArXiv preprint,* 2021; and Recasens et al., each incorporated herein by reference in their entirety. Behrmann et al. uses views of varying locality for disentangling the representation space into temporally local and global features using contrastive objectives. A similar predictive objective with temporal locality constrained views is used in Recasens et al. and contrastive losses with spatial local-global crops is used in Dave et al.

It is one object of the present disclosure to describe a system and method that jointly varies spatial and temporal resolutions and uses a predictive objective as self-supervision. The predictive objective uses view locality to learn correspondences along and across dimensions. It is a further object to describe a system and method that focuses on spatio-temporal constraints extending correspondences across dimensions, uses a single shared network for processing alternate views, and additionally combines varying resolutions to generate alternate views exploiting unique ViT architectural features.

SUMMARY

An aspect is a method of training a video transformer, using machine learning circuitry, for human action recognition in a video, that can include sampling, in a sampling component, video clips with varying temporal resolutions in global views; sampling, in the sampling component, the video clips from different spatiotemporal windows in local views; matching, via the machine learning circuitry, the global and local views in a framework of student-teacher networks to learn cross-view correspondence between local and global views, and to learn motion correspondence between varying temporal resolutions; and displaying, via a display device, each video clip in a manner that emphasizes attention to the recognized human action.

A further aspect is a system for human action recognition in a video, that can include processing circuitry configured to sample video clips of a video with varying temporal resolutions in global views, and sample the video clips from different spatiotemporal windows in local views; machine learning circuitry configured to match the global and local views in a framework of student-teacher networks to learn cross-view correspondence between local and global views, and to learn motion correspondence between varying temporal resolutions; and a display device for displaying each video clip in a manner that emphasizes attention to the recognized human action.

A further aspect is a non-transitory computer readable storage medium storing program code, which when executed by a computer having a CPU and a machine learning engine, perform a method that can include sampling video clips with varying temporal resolutions in global views; sampling the video clips from different spatiotemporal windows in local views; matching, via the machine learning engine, the global and local views in a framework of student-teacher networks to learn cross-view correspondence between local and global views, and to learn motion correspondence between varying temporal resolutions; and displaying each video clip in a manner that emphasizes attention to the recognized human action.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
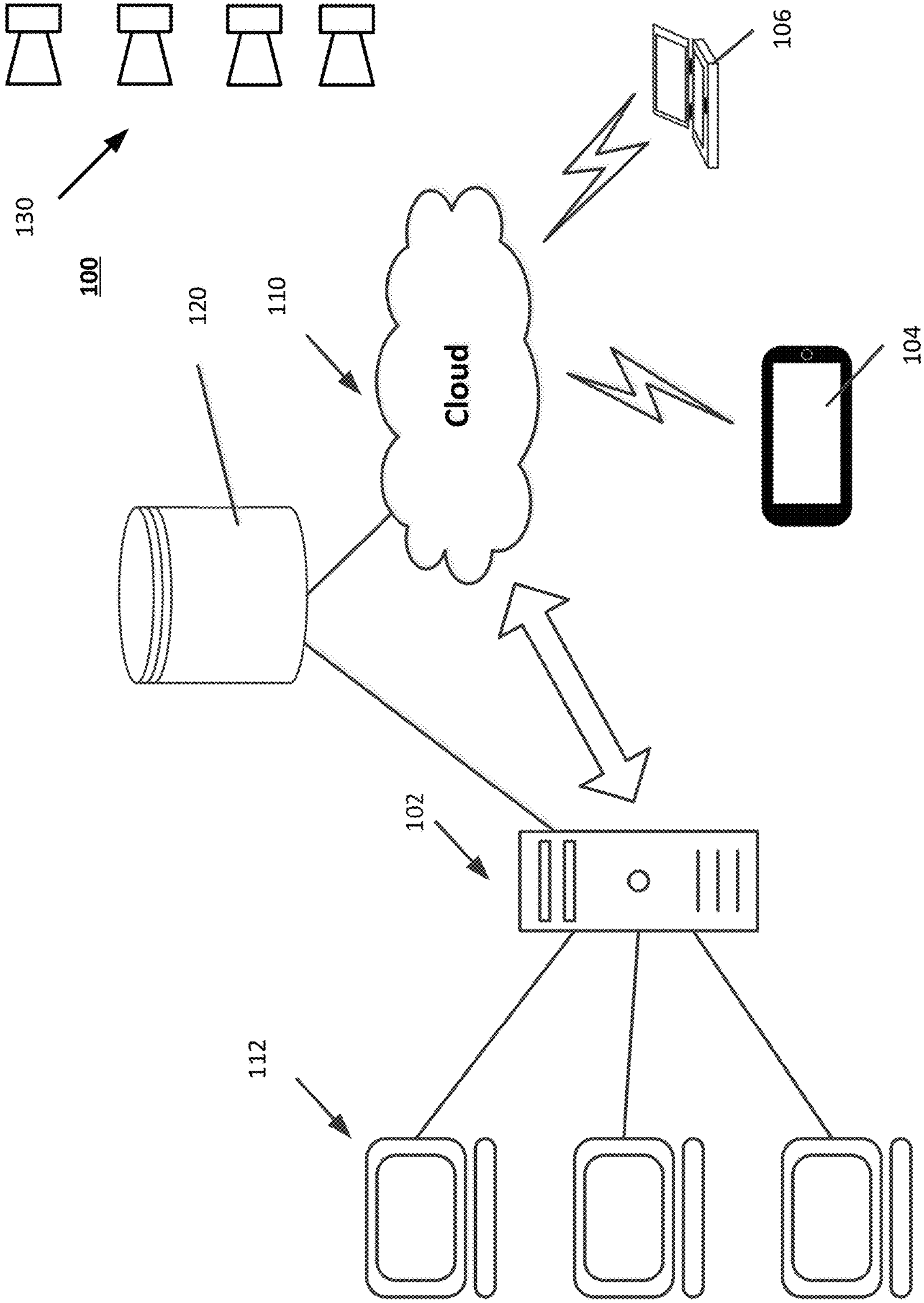
FIG. 1 is a diagram of a machine learning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure relates to a system and training method for a self-supervised video transformer that provides a solution to human action recognition, and in particular interaction recognition. The present disclosure is an improvement over approaches for human action recognition that use contrastive losses between different videos at same resolution for speed consistency or the same video at different resolutions for appearance consistency. The present disclosure is an improvement over approaches for human action recognition that use views of varying locality for disentangling the representation space into temporally local and global features using contrastive objectives.

FIG. 1 is a diagram of a machine learning system 100 in accordance with an exemplary aspect of the disclosure. As will be described in more detail below, the system and method for training a self-supervised video transformer is especially suited for complex human action, such as fast motion that involves interaction between a human and an object or in cases where the video camera is moving while capturing a video of a moving person.

In a non-limiting example, the system and method are applied to real time interaction recognition for the case of a sporting event that is taking place. The sporting event is preferably recorded as a stored video while it is being broadcast. The sporting event can be stored in a local server 120 or in a cloud service 110. The cloud service 110 can be the same cloud service that produces online streaming of the sporting event. The stored video of the sporting event can be analyzed in a high-performance workstation 102 that is configured with one or more machine learning processing engines. Multiple client computers 112 can be used to perform analysis of the interactions recognized in the sporting event video. In some embodiments, the multiple client computers 112 can each be dedicated to analysis of specific action types. In some embodiments, the multiple client computers 112 can be assigned to different sporting event videos, for example, videos captured with different cameras.

In one non-limiting embodiment, the sporting event is a sport, such as soccer, and the interaction recognition includes recognizing different types of ball transfers, including kicks, head buts, etc., and keeping a count of the specific types of ball transfers. The counts of the ball transfers can be used in generating statistics, for example, for an entire team, or broken down for particular team player. Mobile devices 104, 106, or any personal display devices can access statistics of the sporting event, generated, for example, in the cloud service. In a non-limiting embodiment, interaction events can be categorized based on contribution to an end effect, such as assists, scoring, or even errors or penalties. The statistics can be provided to a personal display device in a manner that the user of the display device can monitor performance of preferred players of interest in the sporting event.

In a similar manner, the sporting event is basketball, and the interaction recognition includes recognizing ball transfers including passes between players, passes that go out of bounds, and attempted shots. Again, the cloud service 110 can analyze the data for different types of ball transfers so that users of personal display devices can view statistics for preferred players.

In a further non-limiting implementation, a database of previously stored videos of sporting events is analyzed to obtain broad statistics for particular sporting teams, or particular players for a sport, over a longer period of time than a currently played sporting event. The multiple client computers 112 can be used to perform analysis of the database of stored videos. Although FIG. 1 shows a single high-performance workstation 102 and single database 120, it should be understood that any number of high-performance workstations 102 can be employed in the system 100, as required for the analysis. Also, the database 120 may be a distributed database maintained by several database servers.

In one non-limiting embodiment, the system and method for human action recognition can focus on human actions in a sporting event that involve penalties, especially penalties that relate to potential injuries. The system and method can be configured to recognize particular human actions that are associated with a penalty. In the embodiment, a video clip for the action occurrence for the penalty can be identified and stored for later review. Video clips can be stored in a local database server 120, or in a cloud service 110.

In one non-limiting embodiment, the system 100 includes one or more moving video cameras 130. In the embodiment, one or more video cameras 130 move around an event facility to record the event. The event can be a sporting event, or some other event where a number of people are involved. The video cameras 130 can be mobile ground-based cameras, cameras that are movable along supporting wires, or can be cameras mounted in one or more drones that hover above the event. The video that is captured can be low resolution, or can be high resolution depending on the type and configuration of the video camera. The video captured with the moving video cameras 130 is complicated due to the combination of the motion of the camera in conjunction with the motion of humans that are captured in the video. The camera is movable along one or more of the x, y and x coordinates in space. The camera may be fixed at a point location with capability to pan in one or more of the x, y and x coordinates in space. The camera may be fixed along a track thereby fixing movement along one spatial coordinate while panning or zooming to provide movement in one or more of the other spatial coordinates.

In one non-limiting embodiment, the system 100 involves a moving vehicle having mounted one or more outward facing video cameras 130. In such case, the video cameras 130 are in motion while capturing videos of moving humans. Examples of human motion actions can include a person riding a bicycle, scooter, or skateboard, or a person running or walking.

The system and method for human action recognition can be configured to recognize human actions that may impose potential safety issues, while the vehicle is moving.

Regarding FIG. 1, the system 100 can include at least one server 102 or artificial intelligence (AI) workstation configured for human action recognition. With such a configuration, one or more client computers 112 can connect to the server 102 or special purpose AI workstation so that multiple users can work on human action recognition tasks concurrently. For example, several client computers 112 can be used to perform human action recognition for several videos at a time. In the one embodiment, the server 102 can be connected to a cloud service 110. The cloud service 110 may be accessible via the Internet. The cloud service 110 can include a database system and can be configured to serve streaming video. Mobile devices 104, 106 can be used to access video served by the cloud service 110.

An aspect is an action video recognition service having one or more servers 102 and one or more client computers 112. The action video recognition service can be a service, which provided a video can provide information about human actions, such as the actions that is detected in the video and take appropriate action, such as label the video as having a specific action or actions.

Another aspect is an action recognition software application for a display device, in which any user of a display device will receive information concerning human actions that a video includes. Also, a user can be provided with a list of videos, downloaded, stored, or streamed, that the action recognition application has determined as including the human action. The human action recognition software application can be configured to run in the background as a daemon, or be configured to be invoked by a command and/or function associated with a graphical widget.

The Self-supervised Video Transformer (SVT) jointly varies spatial and temporal resolutions and uses a predictive objective as self-supervision in order to learn variations in space and time from a single video. The SVT includes a mechanism for self-supervised training of video transformers by exploiting spatiotemporal correspondences between varying fields of view (global and local) across space and time. Self-supervision in SVT is performed via a joint motion and cross-view correspondence learning objective. Specifically, global and local spatiotemporal views with varying frame rates and spatial characteristics are matched by motion and cross-view correspondences in the latent space.

As exhibited in examples below, a global view is a full frame or full patch, while a local view is a fraction of the global view. The self-supervised training of SVT takes into consideration spatiotemporal correspondences between the global and local fields of view across space and time, referred to as global and local spatiotemporal views. Joint motion correspondence is learned based on global and local spatiotemporal views with varying frames rates. Cross-view correspondence is learned based on spatial characteristics of global and local spatiotemporal views.

The SVT architecture allows slow-fast training and inference using a single video transformer. The SVT uses dynamic positional encoding to handle variable frame rate inputs generated from the sampling strategy.

In particular, embodiments of the disclosed Self-supervised Video Transformer (SVT) include a student model and a teacher model that are trained with a similarity objective that matches the representations along spatial and temporal dimensions by space and time attention. The training is achieved by creating spatiotemporal positive views that differ in spatial sizes and are sampled at different time frames from a single video. During training, teacher video transformer parameters are updated as an exponential moving average of the student video transformer. Both of the networks process different spatiotemporal views of the same video and an objective function is designed to predict one view from the other in the feature space. This allows SVT to learn robust features that are invariant to spatiotemporal changes in videos while generating discriminative features across videos. See Grill et al. SVT does not depend on negative mining or large batch sizes and remains computationally efficient as it converges within only a few epochs (≈20 on Kinetics-400). See Joao Carreira and Andrew Zisserman. Quo vadis, action recognition? A new model and the Kinetics dataset. In *CVPR,* 2017, incorporated herein by reference in its entirety.

Figure 2:
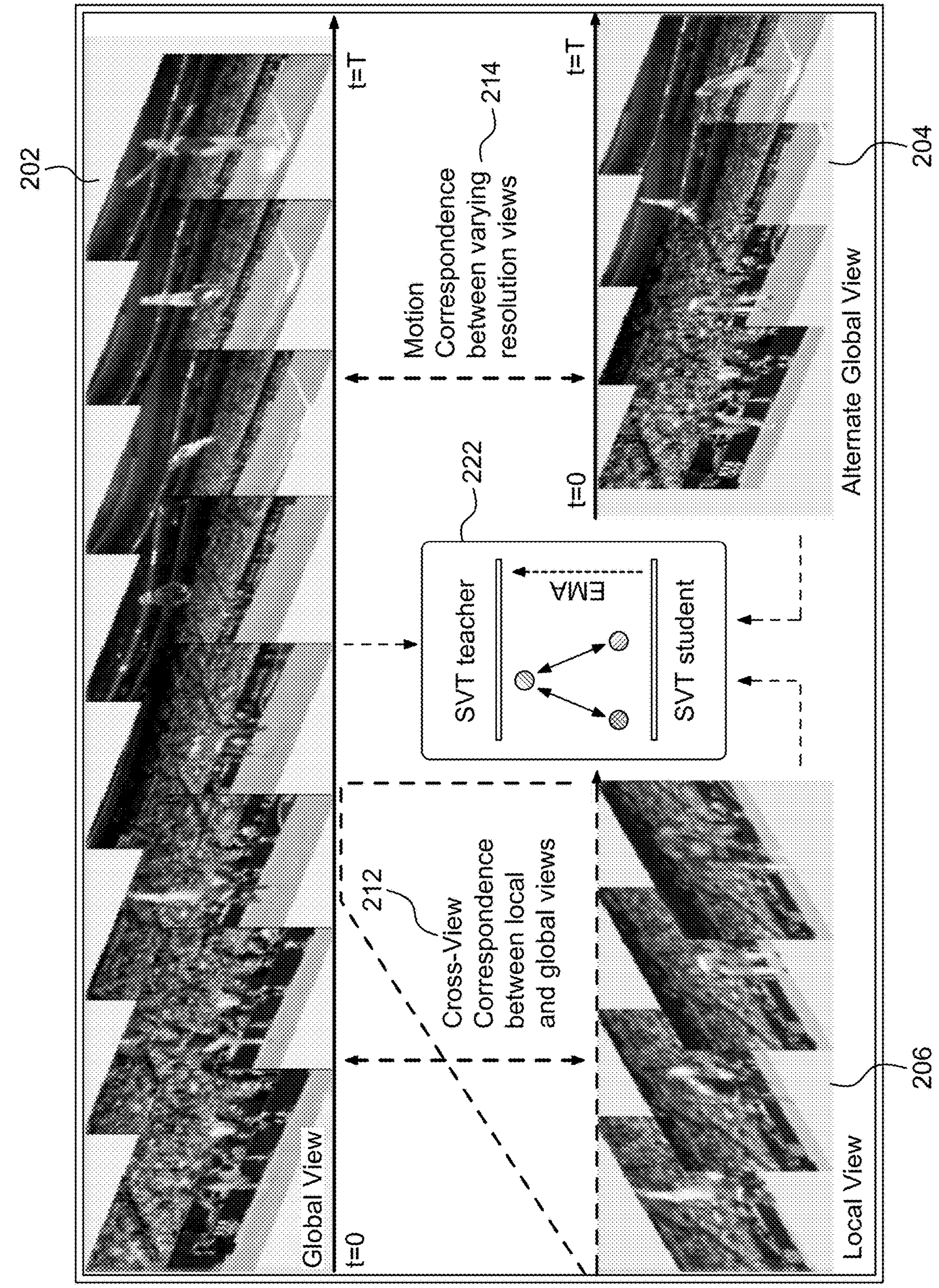
FIG. 2 is a flow diagram of training method for a self-supervised video transformer (SVT), in accordance with an exemplary aspect of the disclosure.

Regarding FIG. 2, the Self-supervised Video Transformer (SVT) learns cross-view 212 and motion 214 correspondences by jointly matching video clips sampled with varying field of view and temporal resolutions. Specifically, Global views (202 and 204) with different temporal resolutions as well as Local views (206) from different spatiotemporal windows are sampled. The representations of these multiple views are matched in a student-teacher framework 222, 224 to learn cross-view and motion correspondences (222). The self-supervised framework can learn high-quality spatiotemporal features while converging faster.

The SVT is characterized by flexibility to model varying time-resolutions and spatial scales within a unified architecture. This is an important feature for video processing since real-world actions can occur with varying temporal and spatial details. Conventional self-supervision based video frameworks merely operate on fixed spatial and temporal scales which can be insufficient for modeling the expressivity and dynamic nature of actions. See Qian et al. and Fanyi Xiao, Joseph Tighe, and Davide Modolo. Modist: Motion distillation for self-supervised video representation learning. *ArXiv preprint,* 2021, each incorporated herein by reference in their entirety. A reason that convolutional backbones used in these approaches lack the adaptability to varying temporal resolutions is due to a fixed number of channels. These approaches require dedicated networks for each resolution. See Christoph Feichtenhofer, Haoqi Fan, Jitendra Malik, and Kaiming He. Slowfast networks for video recognition. In *ICCV,* pages 6202-6211, 2019; and Kumara Kahatapitiya and Michael S Ryoo. Coarse-fine networks for temporal activity detection in videos. In *CVPR,* 2021, each incorporated herein by reference in their entirety. The disclosed SVT addresses this deficiency by using dynamically adjusted positional encodings to handle varying temporal resolutions within the same architecture. Further, the self-attention mechanism in the disclosed SVT can capture both local and global long-range dependencies across both space and time, offering much larger receptive fields as compared to conventional convolutional kernels. See Muzammal Naseer, Kanchana Ranasinghe, Salman Khan, Munawar Hayat, Fahad Shahbaz Khan, and Ming-Hsuan Yang. Intriguing properties of vision transformers. *ArXiv preprint,* 2021, incorporated herein by reference in its entirety.

Self-supervised learning enables extraction of meaningful representations from unlabeled data, alleviating the need for labor intensive and costly annotations. Recent self-supervised methods perform on-par with supervised learning for certain vision tasks. See Mathilde Caron, Piotr Bojanowski, Armand Joulin, and Matthijs Douze. Deep clustering for unsupervised learning of visual features. In *ECCV,* 2018; Mathilde Caron, Ishan Misra, Julien Mairal, Priya Goyal, Piotr Bojanowski, and Armand Joulin. Unsupervised learning of visual features by contrasting cluster assignments. In *NeurIPS,* 2020; Ting Chen, Simon Kornblith, Mohammad Norouzi, and Geoffrey Hinton. A simple framework for contrastive learning of visual representations. In *ICML,* 2020; and Kaiming He, Haoqi Fan, Yuxin Wu, Saining Xie, and Ross Girshick. Momentum contrast for unsupervised visual representation learning. In *CVPR,* 2020, each incorporated herein by reference in their entirety. The necessity of self-supervised learning is even greater in domains such as video analysis where annotations are more costly. See Deng Huang, Wenhao Wu, Weiwen Hu, Xu Liu, Dongliang He, Zhihua Wu, Xiangmiao Wu, Mingkui Tan, and Errui Ding. Ascnet: Self-supervised video representation learning with appearance-speed consistency. In *ICCV,* 2021; Simon Jenni and Hailin Jin. Time-equivariant contrastive video representation learning. In *ICCV,* 2021; AJ Piergiovanni, Anelia Angelova, and Michael S. Ryoo. Evolving losses for unsupervised video representation learning. In *CVPR,* 2020; and Adrià Recasens, Pauline Luc, Jean-Baptiste Alayrac, Luyu Wang, Florian Strub, Corentin Tallec, Mateusz Malinowski, Viorica Patraucean, Florent Altché, Michal Valko, et al. Broaden your views for self-supervised video learning. *ICCV,* 2021, each incorporated herein by reference in their entirety.

At the same time, the emergence of vision transformers (ViTs) and their successful adoption to different computer vision tasks including video understanding within the supervised setting shows their promise in the video domain. See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. *ICLR,* 2021; Anurag Arnab, Mostafa Dehghani, Georg Heigold, Chen Sun, Mario Lučić, and Cordelia Schmid. Vivit: A video vision transformer. *ICCV,* 2021; Gedas Bertasius, Heng Wang, and Lorenzo Torresani. Is space-time attention all you need for video understanding? In *ICML, July* 2021; Haoqi Fan, Bo Xiong, Karttikeya Mangalam, Yanghao Li, Zhicheng Yan, Jitendra Malik, and Christoph Feichtenhofer. Multiscale vision transformers. *ICCV,* 2021; Ze Liu, Jia Ning, Yue Cao, Yixuan Wei, Zheng Zhang, Stephen Lin, and Han Hu. Video swin transformer. *ArXiv preprint,* 2021; Michael S. Ryoo, A. J. Piergiovanni, Anurag Arnab, Mostafa Dehghani, and Anelia Angelova. Tokenlearner: What can 8 learned tokens do for images and videos? *ArXiv preprint,* 2021; and Gilad Sharir, Asaf Noy, and Lihi Zelnik-Manor. An image is worth 16×16 words, what is a video worth? *ArXiv preprint,* 2021, each incorporated herein by reference in their entirety. In fact, recent works using simple ViT backbones surpass convolutional neural networks (CNN) for supervised video analysis with reduced compute workload. See Bertasius et al. Motivated by the ability of self-attention to model long-range dependencies, the present SVT is a simple yet effective method to train video transformers in a self-supervised manner. See Bertasius et al. This process uses spatial and temporal context as a supervisory signal (from unlabelled videos) to learn motion, scale, and viewpoint invariant features.

Many existing self-supervised representation learning methods on videos use contrastive learning objectives which can require large batch sizes, long training regimes, careful negative mining and dedicated memory banks. See Rui Qian, Tianjian Meng, Boqing Gong, Ming-Hsuan Yang, Huisheng Wang, Serge Belongie, and Yin Cui. Spatiotemporal contrastive video representation learning. *CVPR,* 2021; Recasens et al.; and Junyuan Xie, Ross Girshick, and Ali Farhadi. Unsupervised deep embedding for clustering analysis. In *ICML,* 2016, each incorporated herein by reference in their entirety. Further, the contrastive objectives require careful temporal sampling and multiple networks looking at similar/different clips to develop attract/repel loss formulations. See Qian et al. and Recasens et al. In contrast, the present SVT learns self-supervised features from unlabelled videos via self-distillation by a twin network strategy (student-teacher models). See Antti Tarvainen and Harri Valpola. Mean teachers are better role models: Weight-averaged consistency targets improve semi-supervised deep learning results. *ArXiv preprint,* 2017; Mathilde Caron, Hugo Touvron, Ishan Misra, Hervé Jégou, Julien Mairal, Piotr Bojanowski, and Armand Joulin. Emerging properties in self-supervised vision transformers. In *ICCV,* 2021; and Jean-Bastien Grill, Florian Strub, Florent Altché, Corentin Tallec, Pierre H Richemond, Elena Buchatskaya, Carl Doersch, Bernardo Avila Pires, Zhaohan Daniel Guo, Mohammad Gheshlaghi Azar, et al. Bootstrap your own latent: A new approach to self-supervised learning. In *NeurIPS,* 2020, each incorporated herein by reference in their entirety.

Presently disclosed extensive experiments and results on various video datasets including Kinetics-400, UCF-101, HMDB-51, and SSv2 show state-of-the-art transfer of self-supervised features in the present SVT using only RGB data. See Carreira et al.; Khurram Soomro, Amir Roshan Zamir, and Mubarak Shah. UCF101: A dataset of 101 human actions classes from videos in the wild. *ArXiv preprint,* 2012; Hildegard Kuehne, Hueihan Jhuang, Estibaliz Garrote, Tomaso Poggio, and Thomas Serre. HMDB: A large video database for human motion recognition. In *ICCV,* 2011; and Raghav Goyal, Samira Ebrahimi Kahou, Vincent Michalski, Joanna Materzy'nska, Susanne Westphal, Heuna Kim, Valentin Haenel, Ingo Fruend, Peter Yianilos, Moritz Mueller-Freitag, Florian Hoppe, Christian Thurau, Ingo Bax, and Roland Memisevic. The "something something" video database for learning and evaluating visual common sense. In *ArXiv preprint,* 2017, each incorporated herein by reference in their entirety. Further, the presently disclosed method shows a rapid convergence rate.

Self-Supervised Video Transformer

Caron et al. (2021) describes predicting spatially local-global correspondences with ViT backbones within the image domain. The present Self-supervised Video Transformer (SVT) extends the local-global correspondences to the video domain with several improvements.

The contrastive approaches use contrastive losses between different videos at same resolution for speed consistency or the same video at different resolutions for appearance consistency. Unlike these approaches, the present SVT uses spatial and temporal resolutions and uses a predictive objective as self-supervision. The present SVT uses two clips from the same video with varying spatial-temporal characteristics avoiding the need for negative mining or memory banks. During training, the loss formulation matches the representations from both dissimilar clips to enforce invariance to motion and spatial changes for the same action sequence. A naive objective enforcing invariance would collapse all representations to be the same. In contrast, the present SVT uses a teacher-student network pair where the former acts as a more stable target for the later, enabling convergence of the online student network to learn discriminative representations. This approach simultaneously incorporates rich spatiotemporal context in the representations while keeping them discriminative.

SVT: Architecture

Figure 3A:
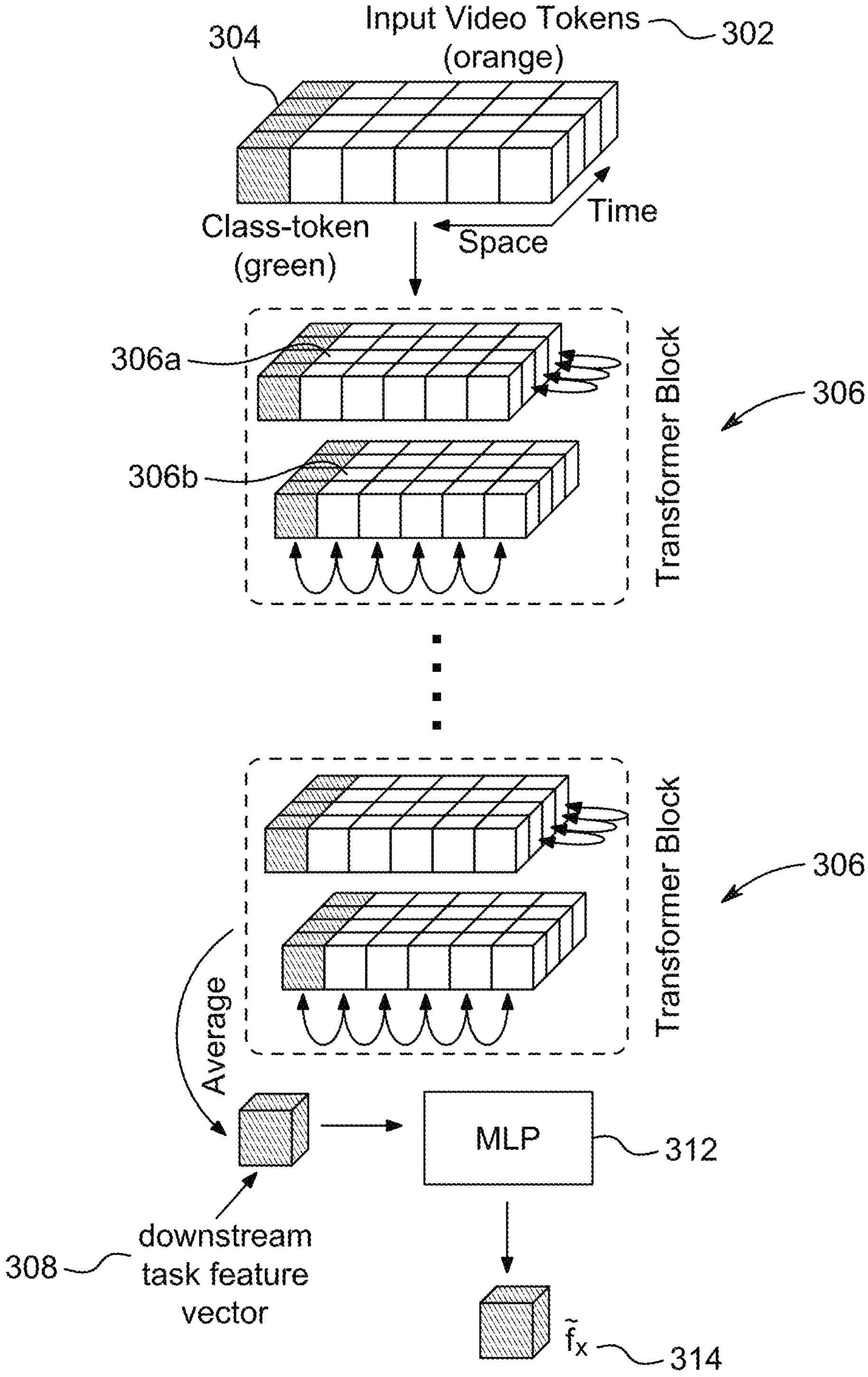
FIG. 3A is a diagram of a network architecture for the SVT.

FIG. 3A is a block diagram of the SVT architecture. The present SVT architecture builds on the TimeSformer backbone of Bertasius et al., The TimeSformer uses a "divided attention" architecture which separately applies temporal attention and spatial attention within each block 306 of the network. For divided attention, within each block 306, temporal attention 306*a* is first computed by comparing each token with all the tokens at the same spatial location in the other frames. The resulting encoding using temporal attention is then fed back for spatial attention 306*b* computation. The backbone is followed by a multilayer perceptron (MLP 312) for predicting target features 314 from online features 308.

Separate attention is applied along temporal and spatial dimensions of input video clips 302 using a video transformer. Regarding FIG. 3B, a video 352, $$X = \{x_t\}_{t=1}^{N}$$

is input, where N represents the number of frames. A clip (also termed view interchangeably) is defined as a subset of these N frames selected through a sampling strategy. H, W, T are defined to be the height, width, and number of frames respectively for the sampled clip. The sampling methodology generates two types of clips, global (g) 354 and local (l) 356 spatiotemporal views. Both g 354 and l 356 are subsets of the video frame set X 352, with views $$g = \{x'_t\}_{t=1}^{K_g},\ l = \{x''_t\}_{t=1}^{K_l},\ \text{and}\ |K_l| \le |K_g|.$$

Global views 354 are generated by uniformly sampling a variable number of frames from a randomly selected 90% portion of a video's time axis. Two such global spatiotemporal views ($g_1$, $g_2$) 362 are generated at low (T=8) and high (T=16) frame rates and spatial resolution H=W=224. Local views 356 are generated by uniformly sampling frames from a randomly selected video region covering $\frac{1}{8}^{th}$ of the time axis and ≈40% area along spatial axes. Eight such local spatiotemporal views 366 are generated with T∈{2, 4, 8, 16} and spatial resolution fixed at H=W=96. Specifically, two global 362 ($g_1$, $g_2$) and eight local 366 ($l_1$, . . . , $l_8$) spatiotemporal views are randomly sampled. Note that both spatial and temporal dimensions within the sampled views differ from those of the original video. The channel dimension, C, is fixed at 3 for RGB inputs. The present SVT, comprising of 12 encoder blocks, processes each sampled clip of shape (C×T×W×H), where W≤224, H≤224 and T≤16 (different for each clip). The network architecture is designed to process such varied resolution clips during both training and inference stages within a single architecture.

During training, each frame within a view is divided into patches. See Dosovitskiy et al. Thus, for a given view of maximum size H=W=224 and T=16, each SVT encoder block processes a maximum of 196 spatial and 16 temporal tokens, and the embedding dimension of each token is $\mathbb{R}^{768}$. See Dosovitskiy et al. Since the maximum number of spatial and temporal tokens vary due to variable dimensions in the views, dynamic positional encoding are deployed to account for any missing tokens for views of size W<224, H<224 and T<16. Note the minimum spatial and temporal sizes in the views are H=W=96 and T=2, respectively. In addition to these input spatial and temporal tokens, a single classification token is used as the feature vector within the architecture. See Devlin et al. and Dosovitskiy et al. This classification token represents the common features learned by the SVT along spatial and temporal dimensions of a given video. Finally, a multi-layer perceptron 312 (MLP) is used as a projection head over the classification token from the final encoder block. See Caron et al. (2021) and Grill et al. The output of the projection head is defined as f314.

Figure 3B:
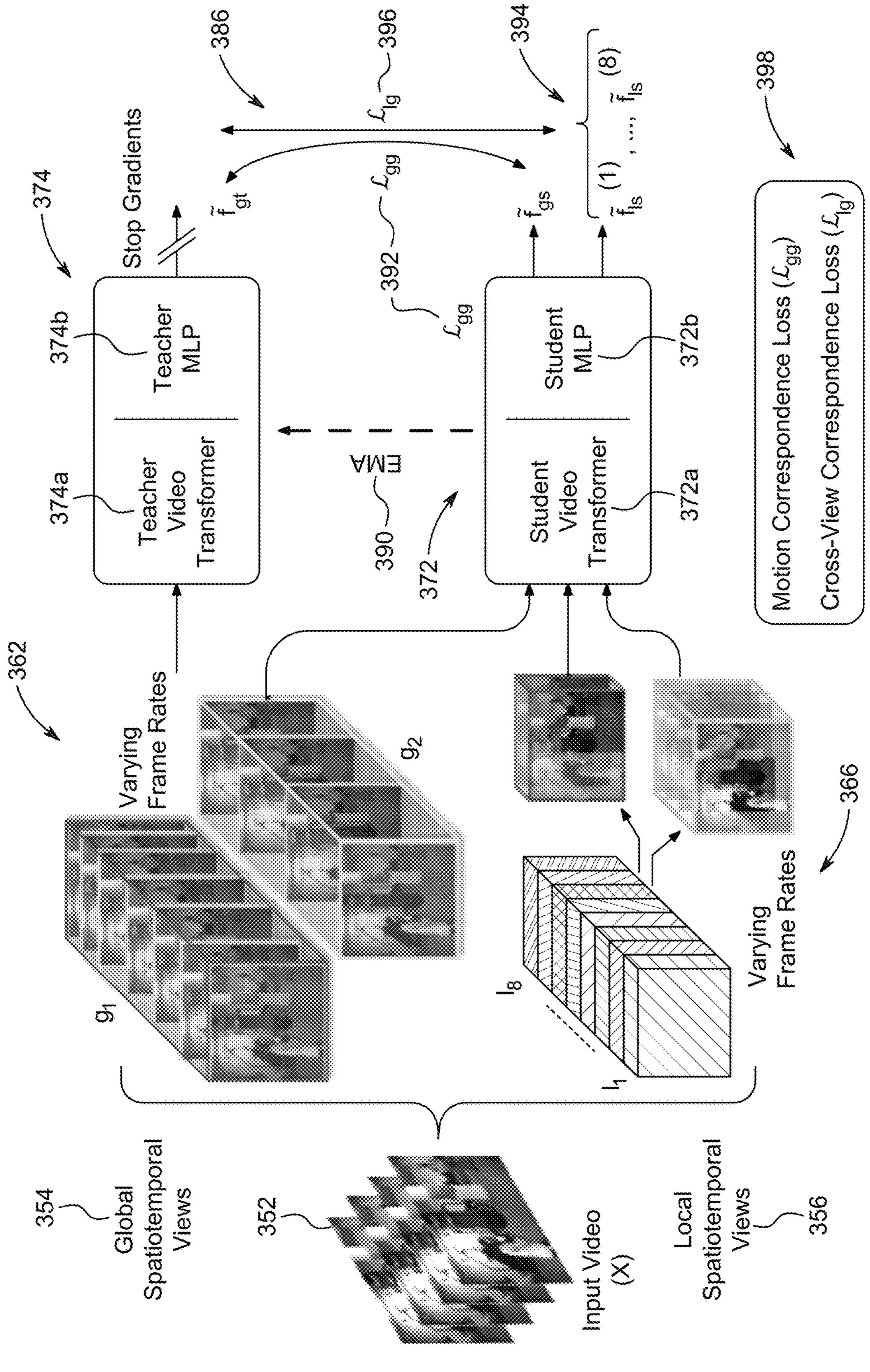
FIG. 3B is a flow diagram for training the SVT with global and local spatiotemporal views, in accordance with an exemplary aspect of the disclosure.

As illustrated in FIG. 3B, the overall approach uses a teacher-student setup inspired for self-distillation. See Caron et al. (2021); Grill et al.; and Tarvainen et al. The present teacher model 374*b* is an exact architectural replica of the student model 372*b*.

SVT: Self-Supervised Training

The present SVT is trained in a self-supervised manner by predicting the different views (video clips) with varying spatiotemporal characteristics from each other in the feature space of student and teacher models. To this end, a simple routing strategy is adopted that randomly selects and passes different views through the teacher 374 and student 372 models. The teacher SVT 374 processes a given global spatiotemporal view 362 to produce a feature vector, $f_{g_t}$ 386, which is used as the target label, while the student SVT 372 processes local 366 and global 362 spatiotemporal views to produce feature vectors, $f_{g_s}$ 394, and $$f_{l_s}^{(1)}, \ldots f_{l_s}^{(2)}$$

398, which are matched to the target feature $f_{g_t}$ 386 through a loss (Eq. 1). During each training step, the student model weights are updated via backpropagation while teacher weights are updated as an exponential moving average (EMA 390) of the student weights. See Caron et al. (2021).

The motivation for predicting such varying views of a video is that it leads to modeling the contextual information defining the underlying distribution of videos by learning motion correspondences (global to global spatiotemporal view matching) and cross-view correspondences (local to global spatiotemporal view matching). This makes the model invariant to motion, scale and viewpoint variations. Thus, the self-supervised video representation learning approach depends on closing the gap between feature representations of different spatiotemporal views from the same video using a self-distillation mechanism. Next, an explanation is provided of how motion correspondences and cross-view correspondences are learned, followed by the loss formulation.

Motion Correspondences

One defining characteristic of a video is the frame rate. Varying the frame rate can change motion context of a video (e.g., walking slow vs walking fast) while controlling nuanced actions (e.g., subtle body-movements of walking action). In general, clips are sampled from videos at a fixed frame rate. See Qian et al. and Xiao et al. However, given two clips of varying frame rate (different number of total frames for each clip), predicting one from the other in feature space explicitly involves modeling the motion correspondences (MC) of objects across frames. Further, predicting subtle movements captured at high frame rates will force a model to learn motion related contextual information from a low frame rate input. This desired property is incorporated into the present training method by matching global to global spatiotemporal views.

Cross-View Correspondences

In addition to learning motion correspondences, the present training method aims to model relationships across spatiotemporal variations as well by learning cross-view correspondences (CVC). The cross-view correspondences are learned by matching the local spatiotemporal views 366 processed by the student SVT 372*a*

$$\left(f_{l_s}^{(i)} : i \in [1, 8]\right) 398$$

with a global spatiotemporal view 362 representation processed by the teacher SVT model 374*a* ($f_{g_t}$) 386. The local views cover a limited portion of videos along both spatial and temporal dimensions.

The intuition is that predicting a global spatiotemporal view of a video from a local spatiotemporal view in the latent space forces the model to learn high-level contextual information by modeling, a) spatial context in the form of possible neighbourhoods of a given spatial crop, and b) temporal context in the form of possible previous or future frames from a given temporal crop. Note that in the cross-view correspondences, a global view frame is predicted using all frames of a local view by a similarity objective (Eq. 3).

Dynamic Positional Embedding

Vision transformers typically require inputs to be converted to sequences of tokens, which allows efficient parallel processing. See Dosovitskiy et al. Positional encoding is used to model ordering of these sequences. See Naseer et al. It is noted that positional encoding also allows a ViT to process variable input resolution by interpolating the positional embedding for the missing tokens. As mentioned earlier, the motion and cross-view correspondences involve varying spatial and temporal resolutions which results in variable spatial and temporal input tokens during training. The property of positional encoding is beneficial because it accommodates varying spatial and temporal tokens in the present training mechanism. In implementing this, during training a separate positional encoding vector is used for spatial and temporal dimensions and these vectors are fixed to the highest resolution across each dimension. Similar to Dosovitskiy et al., the encoding is a learned vector. The positional encoding vectors are varied through interpolation during training to account for the missing spatial or temporal tokens at lower frame rate or spatial size. This allows a single SVT model to process inputs of varying resolution while also giving the positional embedding a dynamic nature which is more suited for different sized inputs in the downstream tasks. During slow-fast inference on downstream tasks, the positional encoding is interpolated to the maximum frame count and spatial resolution used across all views.

It is noted that the learned positional encoding is implicitly tied to frame number to cue the relative ordering of the sampled frames. Given the varying frame rates of views, it does not encode the exact time stamp (frame rate information). Thus, despite not differentiating frame rates, cuing frame order is sufficient for SVT training.

Augmentations

In addition to the sampling strategy (temporal dimension augmentations), image augmentations are also applied to the spatial dimension, i.e., augmentations are applied to the individual frames sampled for each view. Temporally consistent spatial augmentations are followed where the same randomly selected augmentation is applied equally to all frames belonging to a single view. See Qian et al. The augmentations used include random color jitter, gray scaling, Gaussian blur, and solarization. Random horizontal flips are also applied to datasets not containing flip equivariant classes (e.g., walking left to right).

SVT Loss

In the present SVT, motion and cross-view correspondences are enforced by matching the spatiotemporal views within the feature space. Specifically, global to global views are matched to learn motion 392 and local to global views to learn cross-view correspondences 396 by minimizing the following objective:

$$\mathcal{L} = \mathcal{L}_{lg} + \mathcal{L}_{gg}. \quad (1)$$

The global and local spatiotemporal views are passed though the student 372 and teacher 374 models to get the corresponding feature outputs $f_g$ and $f_l$. These feature vectors are normalized to obtain $\tilde{f}$ as follows:

$$\tilde{f}[i] = \frac{\exp(f[i])/\tau}{\sum_{i=1}^{n} \exp(f[i])/\tau},$$

where $\tau$ is a temperature parameter used to control sharpness of the exponential function and $\tilde{f}[i]$ is each element of $\tilde{f} \in \mathbb{R}^n$. See Caron et al. (2021).

Motion Correspondence Loss 392: A global view is forward passed through the teacher SVT 374 serving as the target feature which is compared with an alternate global view processed by the student SVT 372 to obtain a loss term (Eq. 2) 392. This loss measures the difference in motion correspondences between these two global views.

$$\mathcal{L}_{gg} = -\tilde{f}_{g_t} \cdot \log(\tilde{f}_{g_e}), \quad (2)$$

where, $\tilde{f}_{g_s}$ 394 and $\tilde{f}_{g_t}$ 386 are the feature outputs of different global spatiotemporal views from the student and teacher network respectively and [•] is dot product operator.

Cross-view Correspondence Loss 396: All local spatiotemporal views are passed through the student SVT model 372 and mapped to a global spatiotemporal view from the teacher SVT model 374 to reduce the difference in feature representation, learning cross-view correspondences (Eq. 3) 396.

$$\mathcal{L}_{lg} = \sum_{i=1}^{k} -\tilde{f}_{gt} \cdot \log(\tilde{f}_{l_a}^{(i)}), \quad (3)$$

where the sum is performed over k different local spatiotemporal views (k=8 used consistently across all experiments) and $$\tilde{f}_{l_s}^{(i)}$$

398 are the feature outputs for $i^{th}$ local view. Convergence: Given two separate student ($\theta$) and teacher ($\xi$) networks, the overall loss, L is a function of their learnable parameters, $L_{\theta_\xi}$. There exists a concern of collapse to a trivial solution (teacher and student outputs always equal a constant) during training. However, it is noted that the present SVT parameters do not converge to such a minimum over $L_{\theta_\xi}$ because: a) The SVT teacher parameter updates are not in the direction of $\nabla_\xi L_{\theta_\xi}$ since $\xi_{t+1} \leftarrow \tau\xi_t + (1-\tau)\theta_t$ for $\tau \in [0, 1]$ (EMA update). b) SVT's gradient descent on $L_{\theta_\xi}$ does not act jointly over ($\theta$, $\xi$). This is similar to BYOL where such a loss acts on the outputs of student and teacher networks. See Grill et al. Additionally, as suggested in Caron et al. (2021), centering and sharpening of teacher outputs are used to further facilitate convergence.

SVT: Slow-Fast Inference

Figure 4:
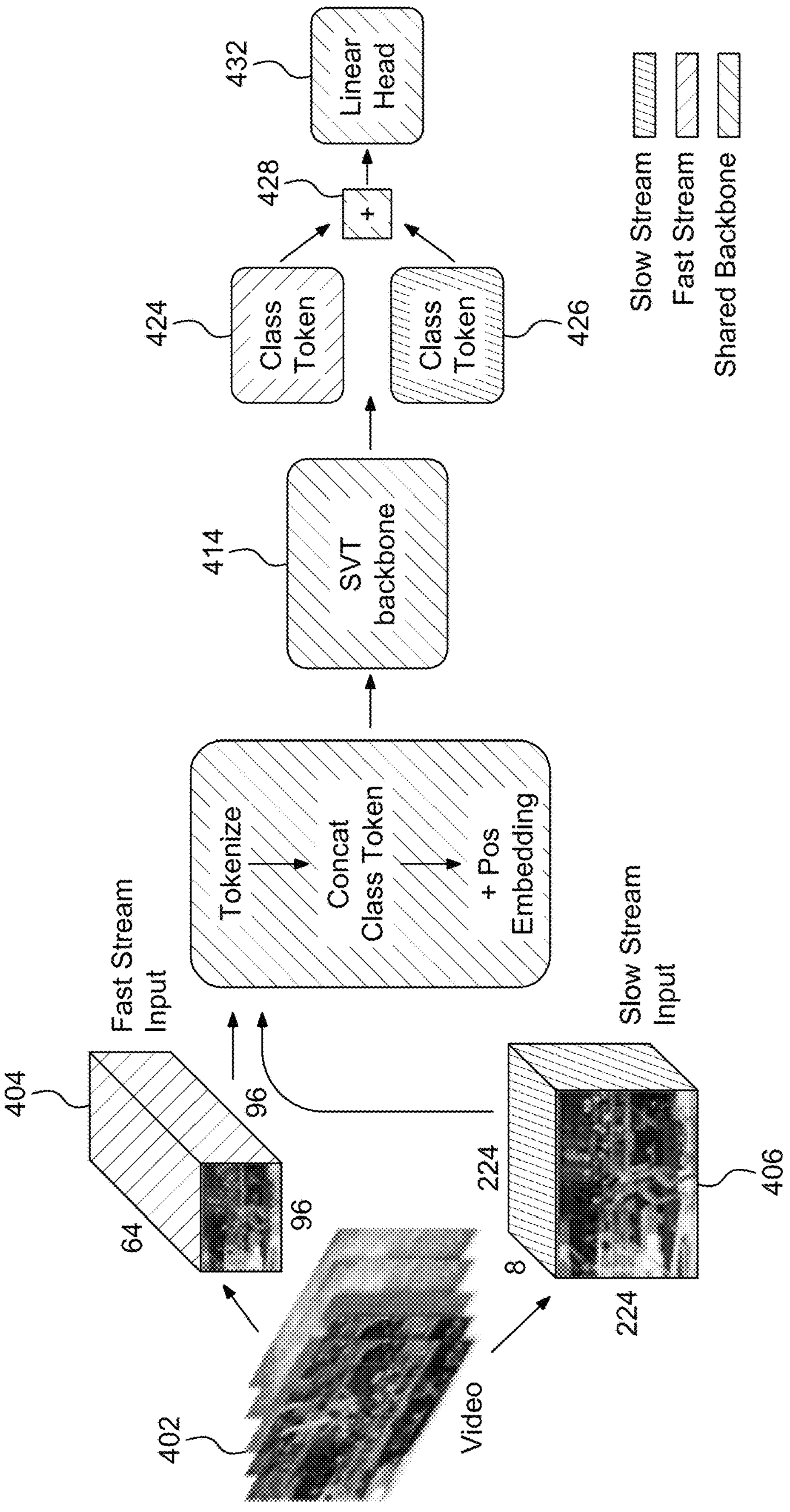
FIG. 4 is a flow diagram for slow-fast inference, in accordance with an exemplary aspect of the disclosure.

FIG. 4 is a block diagram for Slow-Fast inference in the present SVT. Slow-Fast inference refers to using two different video clips: one with high spatial but low temporal resolution, and a second with low spatial but high temporal resolution. This allows capturing finer-information across each dimension, spatial and temporal, with minimal increase in computation. Recent methods deploy such inference but use multiple network architectures for processing videos at different resolutions. See Feichtenhofer et al. (2019) and Kahatapitiya et al. The present dynamic positional encodings allow Slow-Fast inference within a single SVT model, which is illustrated in FIG. 4. The single SVT model with Slow-Fast inference is used on downstream tasks for improved performance.

For Slow-Fast inference, a CPU of a computer system is configured to uniformly sample two clips of the same video at resolutions 406 (8, 224, 244) and 404 (64, 96, 96). The two clips are passed through the shared single SVT network 414, which generates two different feature vectors (class tokens 424, 426). These feature vectors 424, 426 are combined in a deterministic manner (with no learnable parameters), e.g. summation 428, to obtain a joint vector 432 that is fed to a downstream task classifier.

Experiments

Experimental Setup and Protocols

Datasets: The Kinetics-400 data (train set) is used for the self-supervised training phase of SVT. See Carreiar et al. The validation set is used for evaluation. Additionally, the SVT is evaluated on three downstream datasets, UCF-101, HMBD-51, and Something-Something v2 (SSv2). See Soomro et al.; Kuehne et al.; and Raghav Goyal, Samira Ebrahimi Kahou, Vincent Michalski, Joanna Materzy'nska, Susanne Westphal, Heuna Kim, Valentin Haenel, Ingo Fruend, Peter Yianilos, Moritz Mueller-Freitag, Florian Hoppe, Christian Thurau, Ingo Bax, and Roland Memisevic. The "something something" video database for learning and evaluating visual common sense. In *ArXiv preprint*, 2017, each incorporated herein by reference in their entirety.

Self-supervised Training: The computer program for implementing the present SVT is maintained in a GitHub repository (git.io/J1juJ) and can be configured for execution on GPUs. The models are trained for 20 epochs on the train set of Kinetics-400 dataset without any labels using a batch size of 32 across 4 NVIDIA-A100 GPUs. See Carreira et al. This batch size refers to the number of unique videos present within a given batch. The weights relevant to temporal attention are randomly initialized while spatial attention weights are initialized using a ViT model trained in a self-supervised manner over the ImageNet-1k dataset. See Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei. Imagenet large scale visual recognition challenge. *IJCV,* 2015, incorporated herein by reference in its entirety. This initialization setup is followed to obtain faster space-time ViT convergence similar to the supervised setting. See Bertasius et al. An Adam optimizer is used with a learning rate of 5e-4 scaled using a cosine schedule with linear warmup for 5 epochs. See Diederik P. Kingma and Jimmy Ba. Adam: A method for stochastic optimization. In *ICLR,* 2015; Xinlei Chen*, Saining Xie*, and Kaiming He. An empirical study of training self-supervised vision transformers. *ArXiv preprint,* 2021; and Steiner et al., each incorporated herein by reference in their entirety. Weight decay scaled from 0.04 to 0.1 is also used during training. The code builds over the training frameworks. See Bertasius et al.; Caron et al. (2021); Haoqi Fan, Yanghao DLi, Bo Xiong, Wan-Yen Lo, and Christoph Feichtenhofer. Pyslowfast. https://github.com/facebookresearch/slowfast, 2020; and Ross Wightman. Pytorch image models. https://github.com/rwightman/pytorch-image-models, 2019, each incorporated herein by reference in their entirety.

Downstream Tasks: Two types of evaluations are performed on ther downstream task of action recognition for each dataset, a) Linear: A linear classifier is trained over the pre-trained SVT backbone (which is frozen during training) for 20 epochs with a batch size of 32 on a single NVIDIA-V100 GPU. SGD is used with an initial learning rate of 8e-3, a cosine decay schedule and momentum of 0.9 similar to recent work; b) Fine-tuning: The projection head over the SVT is replaced with a randomly initialized linear layer, initialize the SVT backbone with the pre-trained weights, and train the network end-to-end for 15 epochs with a batch size of 32 across 4 NVIDIA-V100 GPUs. See Caron et al. (2021) and Qian et al. SGD is used with a learning rate of 5e-3 decayed by a factor of 10 at epochs 11 and 14, momentum of 0.9, and weight decay of 1e-4 following Bertasius et al.

During both training of linear classifier and fine-tuning of SVT, two clips of varying spatiotemporal resolution are sampled from each video. During evaluation, a slow-fast inference strategy is followed. Two clips per video are sampled at different spatiotemporal resolutions (T, W, H)∈{(8, 224, 224), (64, 96, 96)} with 3 spatial crops each for testing (6 clips in total). This is computationally more efficient in comparison to recent works that uniformly sample 10 clips at similar or high resolutions from full-length videos with 3 crops each for testing (total of 30 clips per video). See Qian et al. and Recasens et al.

Results

The present SVT results are compared with state-of-the-art approaches (trained on RGB input modality for fair comparison) for the downstream task of human action recognition.

UCF-101 & HMDB-51: the present method out-performs state-of-the-art for UCF-101 and is on-par for HMDB-51 (Table 1). While CORP exhibits higher performance on HMDB-51, SVT is highlighted as to how it: a) is pretrained for a much shorter duration (20 epochs) with smaller batch-sizes (32); b) uses a single architectural design across all tasks. See Kai Hu, Jie Shao, Yuan Liu, Bhiksha Raj, Marios Savvides, and Zhigiang Shen. Contrast and order representations for video self-supervised learning. In *ICCV,* 2021, incorporated herein by reference in its entirety. CORP models are pre-trained for 800 epochs with a batch-size of 1024 using 64 NVIDIA-V100 GPUs and uses different variants ($CORP_f$ and $CORP_m$) to obtain optimal performance on different datasets. See Hu et al.

Kinetics-400: Results on Kinetics-400 are presented in Table 2 where the present approach obtains state-of-the-art for both linear evaluation and fine-tuning settings. See Carreira et al. Performance on Kinetics-400 is heavily dependent on appearance attributes, i.e. a large proportion of its videos can be recognized by a single frame. See Yi Zhu, Xinyu Li, Chunhui Liu, Mohammadreza Zolfaghari, Yuanjun Xiong, Chongruo Wu, Zhi Zhang, Joseph Tighe, R Manmatha, and Mu Li. A comprehensive study of deep video action recognition. *ArXiv preprint,* 2020, incorporated herein by reference in its entirety. Strong performance of SVT on this dataset exhibits how well our proposed approach learns appearance related contextual information.

SSv2: Similarly, state-of-the-art results on SSv2 dataset are obtained for both linear evaluation and fine-tune settings as presented in Table. 3. See Goyal et al. Multiple classes in SSv2 share similar backgrounds and object appearance, with complex movements differentiating them. See Hu et al. Performance on this dataset indicates how SVT feature representations capture strong motion related contextual cues as well.

Table 1 shows results for UCF-101 & HMBD-51, top-1 (%) accuracy for both linear evaluation and fine-tuning. See Soomro et al. and Kuehne et al. All models are pre-trained on Kinetics-400 except ELo which uses YouTube8M dataset. See Carreira et al.; Piergiovanni et al.; and Sami Abu-El-Haija, Nisarg Kothari, Joonseok Lee, Apostol (Paul) Natsev, George Toderici, Balakrishnan Varadarajan, and Sudheendra Vijayanarasimhan. Youtube-8m: A large-scale video classification benchmark. In *ArXiv preprint,* 2016, each incorporated herein by reference in their entirety. Gray shaded methods use additional optical flow inputs. S-Res and T-Res represent spatial and temporal input resolution, respectively. The present approach shows state-of-the-art or on par performance.

TABLE 1

Comparison of results for UCF-101 & HMBD-51.

| | | | | | | UCF-101 | | HMDB-51 | |
|---|---|---|---|---|---|---|---|---|---|
| Method | Backbone | TFLOPs | S-Res | T-Res | Epochs | Linear | Fine-tune | Linear | Fine-tune |
| MEMDPC (ECCV '20) | R2D3D-34 | — | 224 | 64 | — | 54.1 | 86.1 | 30.5 | 54.5 |

TABLE 1-continued

Comparison of results for UCF-101 & HMBD-51.

| Method | Backbone | TFL OPs | S-Res | T-Res | Epochs | UCF-101 Linear | UCF-101 Fine-tune | HMDB-51 Linear | HMDB-51 Fine-tune |
|---|---|---|---|---|---|---|---|---|---|
| CoCLR (Neurips '20) | S3D | 0.07 | 128 | 32 | 100 | 77.8 | 87.9 | 52.4 | 54.6 |
| Elo (CVPR '20) | R(2 + 1)D | 17.5 | 224 | — | 100 | — | 84.2 | — | 53.7 |
| RSPNet (AAAI'21) | S3D-G | 0.07 | 112 | 16 | 200 | — | 89.9 | — | 59.6 |
| VideoMoCo (CVPR '21) | R(2 + 1)D | 17.5 | 112 | 32 | 200 | 78.7 | — | 49.2 | — |
| Be (CVPR '21) | I3D | 2.22 | 224 | 16 | 50 | — | 87.1 | — | 56.2 |
| CMD (CVPR '21) | R(2 + 1)D-26 | — | 112 | 16 | 120 | — | 85.7 | — | 540. |
| CVRL (CVPR '21) | R3D-50 | 3.19 | 224 | 32 | 800 | 89.2 | 92.2 | 57.3 | 66.7 |
| TCLR (Arxiv '21) | R(2 + 1)D-18 | — | 112 | 16 | 100 | — | 84.3 | — | 54.2 |
| MoDist (CVPR '21) | R3D-50 | 3.19 | 224 | 8 | 100 | 91.5 | 94.0 | 63.0 | 67.4 |
| Bra Ve (ICCV '21) | R3D-50 | 3.19 | 224 | 16 | — | 92.5 | 95.1 | 68.3 | 74.6 |
| $Vi^2CLR$ (ICCV '21) | S3D | 0.07 | 128 | 32 | 300 | 75.4 | 89.1 | 47.3 | 55.7 |
| ASCNet (ICCV '21) | S3D-G | 0.07 | 224 | 64 | 200 | — | 90.8 | — | 60.5 |
| TEC (ICCV '21) | S3D-G | 0.07 | 128 | 32 | 200 | — | 88.2 | — | 63.5 |
| LSFD (ICCV '21) | C3D | — | 224 | 16 | — | — | 79.8 | — | 52.1 |
| MCN (ICCV '21) | R3D | 3.19 | 128 | 32 | 50 | 73.1 | 89 | 42.9 | 59.3 |
| CORP (ICCV '21) | R3D-50 | | 224 | 16 | 800 | 90.2 | 93.5 | 58.7 | 68.0 |
| SVT | VIT-B | 0.59 | 224 | 16 | 20 | 90.8 | 93.7 | 57.8 | 67.2 |

Table 2 shows a comparison of results for Kinetics-400, top-1 (%) accuracy is reported for both linear evaluation and fine-tuning on the Kinetics-400 validation set. See Carreira et al. All models are pre-trained on the training set of Kinetics-400 dataset. The present approach shows state-of-the-art performance.

TABLE 2

Comparison of results for Kinetics-400.

| Method | Backbone | Fine-tune | Linear |
|---|---|---|---|
| $CVRL_{(CVRP'21)}$ | R3D-101 | 70.4 | 67.6 |
| $Vi2CLR_{(ICCV'21)}$ | S3D | 71.2 | 63.4 |
| $CORP_{(ICCV'21)}$ | R3D-50 | — | 66.6 |
| SVT | VIT-B | 78.1 | 68.1 |

Table 3 shows a comparison of results for SSv2, top-1 (%) for both linear evaluation and fine-tuning on the SSv2 validation set. See Goyal et al. All models are pre-trained on Kinetics-400. The present approach produces best results.

TABLE 3

Comparison of results for SSv2.

| Method | Backbone | Fine-tune | Linear |
|---|---|---|---|
| $MoDist_{(Arxiv '21)}$ | R3D-50 | 54.9 | 16.6 |
| $CORP_{(ICCV'21)}$ | R3D-50 | 48.8 | — |
| SVT | VIT-B | 59.2 | 18.3 |

Ablative Analysis

The contribution of each component of the present method are systematically dissected. The effect of five individual elements are studied: a) different combinations of local and global view correspondences; b) varying field of view along temporal vs spatial dimensions; c) temporal sampling strategy; d) spatial augmentations; e) slow-fast inference. In all our ablative experiments, SVT self-supervised training uses a subset of the Kinetics-400 train set containing 60K videos. Evaluation is carried out over alternate train-set splits of UCF-101 and HMDB-51. The SVT is trained for 20 epochs and evaluated.

View Correspondences. Learning correspondences between local and global views is the key motivation behind our proposed cross-view correspondences. Since multiple local-global view combinations can be considered for matching and prediction between views, the effect of predicting each type of view from the other is presented in Table. 4. It can be observed that jointly predicting local to global and global to global view correspondences results in the optimal performance, while predicting global to local or local to local views leads to reduced performance. This trend exists due to the emphasis on learning rich context in the case of joint prediction, which is absent for individual cases. Further, the performance drop for local to local correspondences (non-overlapping views) conforms with previous findings on the effectiveness of temporally closer positive views for contrastive self-supervised losses. See Feichtenhofer (2021) and Qian et al.

Table 4 shows view Correspondences. Predicting local to global and global to global views remains optimal over any other combination.

TABLE 4

View Correspondences.

| l →g | g →g | l →l | g →l | UCF-101 | HMDB-51 |
|---|---|---|---|---|---|
| ✓ | x | x | x | 84.11 | 50.72 |
| x | ✓ | x | x | 81.95 | 49.04 |
| ✓ | ✓ | x | x | 84.64 | 52.17 |
| ✓ | ✓ | ✓ | x | 83.11 | 51.23 |
| ✓ | ✓ | x | ✓ | 84.71 | 51.88 |
| ✓ | ✓ | ✓ | ✓ | 83.69 | 51.71 |

Table 5 shows Spatial vs Temporal variations. Cross-view correspondences with varying field of view along both spatial and temporal dimensions lead to optimal results. Temporal variations between views has more effect than applying only spatial variation.

TABLE 5

| Spatial vs Temporal variations. | | | |
|---|---|---|---|
| Spatial | Temporal | UCF-101 | HMDB-51 |
| ✓ | x | 73.81 | 42.91 |
| x | ✓ | 82.90 | 42.59 |
| ✓ | ✓ | 84.64 | 52.17 |

Table 6 shows temporal sampling strategy. The present temporal sampling strategy, motion correspondences (MC), is trained against the alternate approach of temporal interval sampler (TIS) used with CNNs under contrastive settings. See Qian et al.

TABLE 6

| Temporal Sampling Strategy | | |
|---|---|---|
| | UCF-101 | HMDB-51 |
| SVT + TIS | 82.24 | 50.10 |
| SVT + MC | 84.64 | 52.17 |

Table 7 shows augmentations using temporally consistent augmentations (TCA) applied randomly over the spatial dimensions for different views which result in consistent improvements on UCF-101 and HMDB-51 datasets. See Qian et al.

TABLE 7

| Augmentations. | | |
|---|---|---|
| | UCF-101 | HMDB-51 |
| w/o TCA | 84.20 | 52.10 |
| w TCA | 84.64 | 52.17 |

Table 8 shows results for Slow-Fast Inference. Feeding multiple views of varying spatiotemporal resolutions to a single shared network (multi-view) results in clear performance gains over feeding single-views across both UCF-101 and HMDB-51 datasets.

TABLE 8

| Slow-Fast Inference | | |
|---|---|---|
| Slow-Fast | UCF-101 | HMDB-51 |
| x | 84.64 | 52.17 |
| ✓ | 84.80 | 53.22 |

Spatial vs Temporal Field of View. The optimal combination of spatiotemporal views in Table 4 involves varying the field of view (crops) along both spatial and temporal dimensions. The effects of these variations (spatial or temporal) are studied in Table 5. No variation along the spatial dimension denotes that all frames are of fixed spatial resolution 224×224 with no spatial cropping, and no temporal variation denotes that all frames in our views are sampled from a fixed time-axis region of a video. It can be observed that temporal variations have a significant effect on UCF-101, while variations in the field of view along both spatial and temporal dimension perform the best (Table 5).

Temporal Sampling Strategy. Temporal sampling strategy for motion correspondences (MC) can be replaced with alternate sampling approaches. To verify the effectiveness of MC, MC is replaced within SVT with an alternate approach. The temporal interval sampling (TIS) strategy in Qian et al. obtains state-of-the-art performance under their contrastive video self-supervised setting with CNN backbones. The experiments incorporating TIS in SVT (Table 6) highlight the advantage of our proposed MC sampling strategy over TIS.

Augmentations: Standard spatial augmentations are used on videos. Temporally consistent augmentations (TCA) proposed in Qian et al. lead to improvements in their CNN based video self-supervision approach. The effect on the present approach is evaluated in Table 7 which shows slight improvements. Given these performance gains, TCA is adopted in the SVT training process as well.

Slow-Fast Inference: Finally, the effect of the Slow-Fast inference is studied in Table 8. Higher gains are observed on HMDB-51, where the classes are easier to separate with motion information. See Kuehne et al. and Han et al. (2020).

The disclosed video transformer based model is trained using self-supervised objectives named SVT. Given an input video sequence, our approach first creates a set of spatiotemporally varying views sampled at different scales and frame rates from the same video. Two sets of correspondence learning tasks are then defined which seek to model the motion properties and cross-view relationships between the sampled clips. Specifically, the self-supervised objective reconstructs one view from the other in the latent space of student and teacher networks. The approach is fast to train (converges within only a few iterations), does not require negative samples and large batch sizes that are required by previous contrastive video representation learning methods. Additionally, the SVT allows modeling long-range spatiotemporal dependencies and can perform dynamic slow-fast inference within a single architecture. SVT is evaluated on four benchmark action recognition datasets where it performs well in comparison to existing state of the art.

As indicated above, SVT is explored within the context of RGB input modality. Given large-scale multi-modal video datasets, the additional supervision available in the form of alternate modalities can be used. Furthermore, the present SVT can be modified to utilize multi-modal data sources.

View Routing and Matching

The present SVT uses a single global view passed through the teacher, which generates target for all the other views passed through the student model. In one exemplary implementation, multiple global views are all passed through the teacher model, and each student view (global and local) are separately mapped to the multiple teacher targets. In the case of two global views 362, g1 (T=8) and g2 (T=16), two targets 386, $$\tilde{f}_{gt}^{(1)} \text{ and } \tilde{f}_{gt}^{(2)}$$

are obtained. Both these global views are also passed through the student model 372 to obtain $$\tilde{f}_{gs}^{(1)} \text{ and } \tilde{f}_{gs}^{(2)}$$

394. Map $$\tilde{f}_{gs}^{(1)} \text{ to } \tilde{f}_{gt}^{(2)}$$

and $$\tilde{f}_{gs}^{(2)} \text{ to } \tilde{f}_{gt}^{(1)}.$$

The local views passed through the student that generates $$\tilde{f}_{ls}^{(1)} \ldots \tilde{f}_{ls}^{(8)}$$

398 which are separately mapped to both teacher targets 386, $$\tilde{f}_{gt}^{(1)} \text{ and } \tilde{f}_{gt}^{(2)}.$$

The present loss is applied over each mapped student-teacher feature pair.

Comparison to Supervised Training

In the SVT, a standard ViT backbone is used with split attention across space and time dimensions similar to Bertasius et al. SVT is compared with supervised pre-training based initialization for Kinetics-400 training reported in Bertasius et al. For fairness, the comparison with Bertasius et al. includes the highest reported input resolution used in their work since the SVT uses slow-fast inference. These results are presented in Table I.

Table 9 shows a comparison of SVT with supervised pretraining methods containing similar backbone (ViT-B) on Kinetics-400. For each different pre-training strategy, the methods are finetuned on Kinetics-400 and report accuracy (top-1) on Kinetics-400 validation set.

TABLE 9

Comparison of SVT with supervised pretraining methods containing similar backbone (ViT-B) on Kinetics-400.

| Pretrain Dataset | Supervision | Accuracy |
|---|---|---|
| Random-init | — | 64.8 |
| ImageNet-1K | ✓ | 75.8 |
| ImageNet-21K | ✓ | 79.7 |
| ImageNet-1K | × | 69.9 |
| Kinetics-400 | X | 78.1 |

Dataset Description

The Kinetics-400 training set is used for the SVT self-supervised training and its validation set for evaluation of learned self-supervised representations. See Carreira et al. Kinetics-400 is a large-scale dataset containing 240 k training videos and 20 k validation videos belonging to 400 different action classes. On average, these videos are of duration around 10 seconds, with 25 frames per second (i.e., around 250 frames per video). Interestingly, most classes of this dataset are considered to be separable with appearance information alone. See Yi Zhu, Xinyu Li, Chunhui Liu, Mohammadreza Zolfaghari, Yuanjun Xiong, Chongruo Wu, Zhi Zhang, Joseph Tighe, R Manmatha, and Mu Li. A comprehensive study of deep video action recognition. *ArXiv preprint*, 2020, incorporated herein by reference in its entirety. In addition to Kinetics-400, the present approach is evaluated on three downstream datasets, UCF-101, HMBD-51, and Something-Something v2 (SSv2). See Soomro et al.; Kuehne et al.; and Goyal et al. UCF-101 and HMBD-51 are small-scale datasets each containing 13 k videos (9.5 k/3.7 k train/test) belonging to 101 classes and 5 k (3.5 k/1.5 k train/test) videos belonging to 51 classes respectively, while SSv2 is a large-scale dataset heavily focused on motion with 168 k training and 24 k validation videos belonging to 174 action classes. Unlike UCF101 and HMDB51 which contain action classes similar to Kinetics-400, SSv2 contains very different actions involving complex human object interactions, such as 'Moving something up' or 'Pushing something from left to right'.

Attention Visualization

Following the approach in Caron et al. (2021), the attention of the present classification token (feature vector) towards each spatiotemporal patch token within the final encoder block of SVT for two selected videos. SVT attends to the regions of motion in these videos, even in the case of highly detailed backgrounds (right). Attention to the salient moving object in each case qualitatively demonstrates how the present cross-view and motion correspondences learn spatiotemporally invariant representations.

Figure 5A:
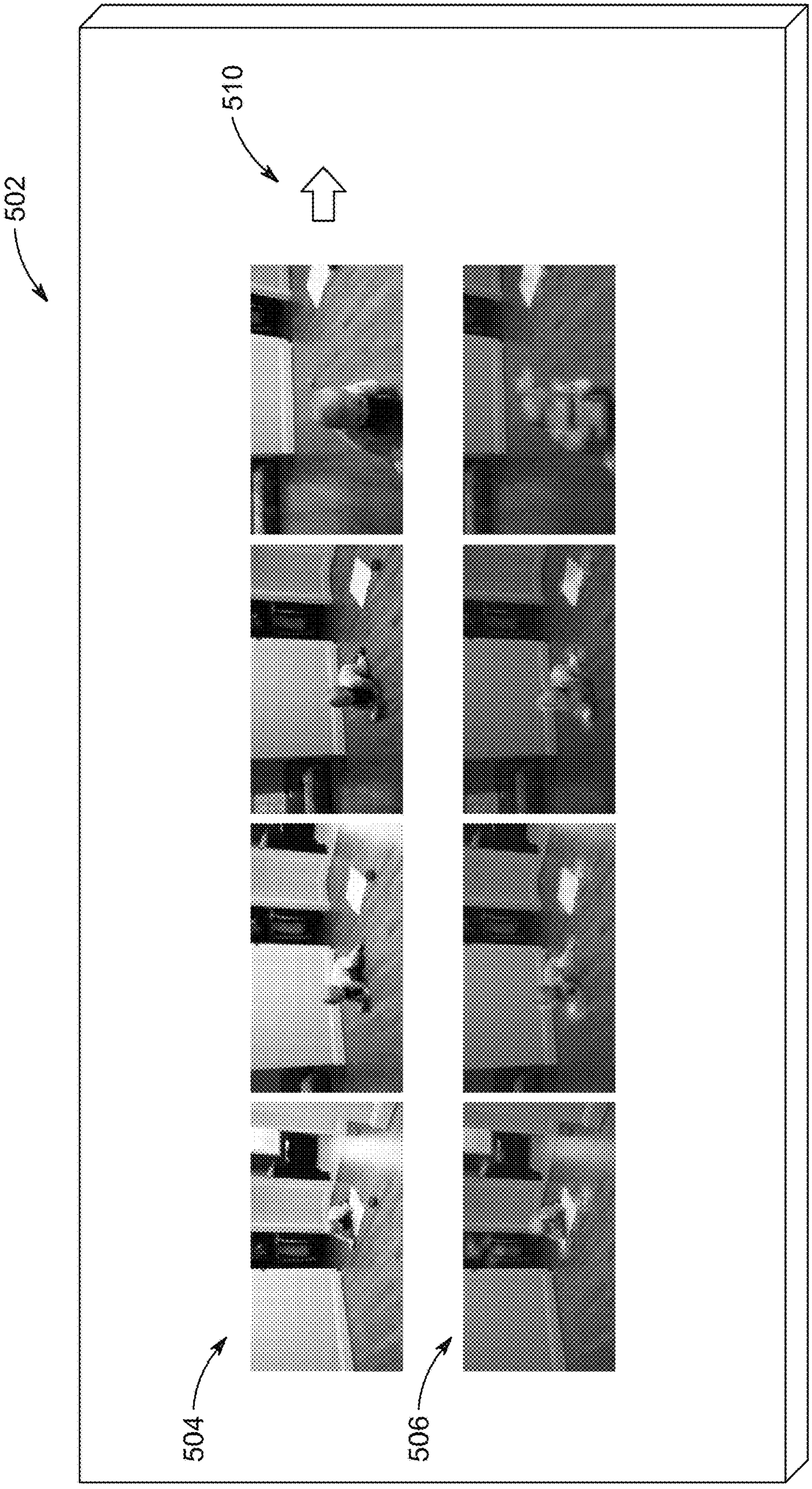
FIGS. 5A and 5B are exemplary user interface screens for monitoring and analyzing action recognition, in accordance with an exemplary aspect of the disclosure.
Figure 5B:
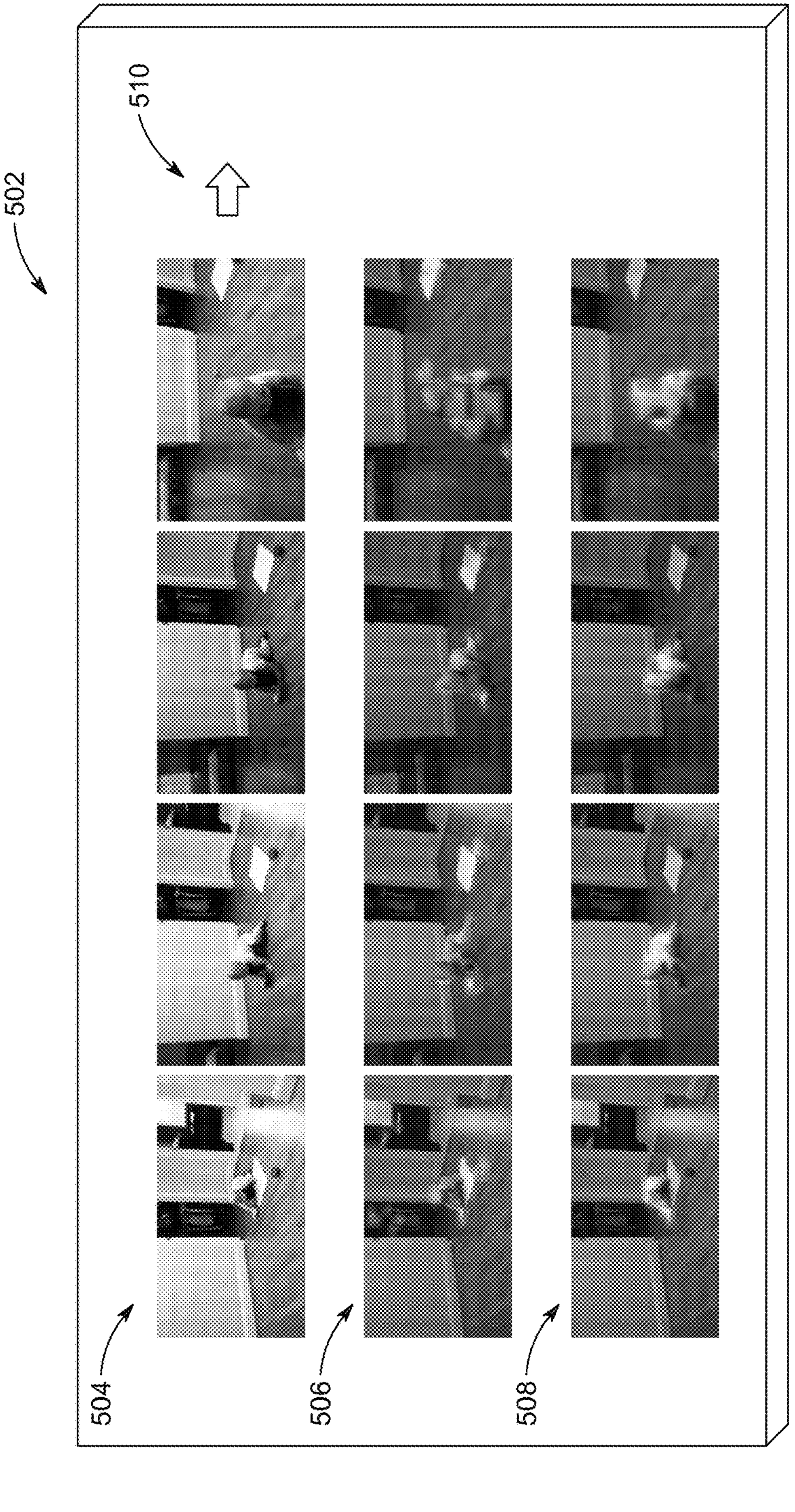
Figure 6A:
FIGS. 6A and 6B are exemplary user interface screens for monitoring and analyzing action recognition, in accordance with an exemplary aspect of the disclosure.
Figure 6B:

FIGS. 5A and 6A illustrate displays for four frames from two videos (FIGS. 5A and 6A respectively). In order to visualize human action recognition, FIG. 5A is a display 502 that displays the original video frames 504 for a crawling baby together with attention based on the vision transformer, SVT 506, shown with attention emphasized by bounding boxes. In FIG. 5B the display 502 allows for a comparison of the attention from SVT 506 and another vision transformer, such as DINO 508. The frames may be scrolled 510 to show another set of four frames. In a similar manner, FIG. 6A is a display 602 that displays the original video frames 604 for a person walking on hands together with attention based on the vision transformer, SVT 606, shown with attention emphasized by bounding boxes. In this case, the video frames 604 have a highly detailed background. In FIG. 6B the display 602 allows for a comparison of the attention based on SVT 606 and another vision transformer, such as DINO 608. The frames may be scrolled 610 to show a next set of video frames.

In FIG. 5B, it can be seen that DINO attention 508 is scattered around multiple objects, while the attention of the SVT 506 is focused on 'crawling baby,' as emphasized by bounding boxes. In FIG. 6B, it can be seen that 'person walking on hands' across frames which are the salient objects for this action, as emphasized by bounding boxes. This highlights how SVT learns to focus attention on the motion within a video.

In a non-limiting example, a video of a sporting event can be analyzed using a high-performance workstation 102 that is configured with one or more machine learning processing engines. Multiple client computers 112 having a display, such as display 602, are used to perform analysis of the interactions recognized in the sporting event video. In some embodiments, the multiple client computers 112 can each be dedicated to analysis of specific action types. In some embodiments, the multiple client computers 112 can be assigned to different sporting event videos, for example, videos captured with different cameras. When a particular type of human action is recognized by the SVT, the video clip containing the recognized human action is displayed on the display of the client computer 112.

In one non-limiting embodiment, the sporting event is a sport, such as soccer, and the interaction recognition includes an SVT that is configured to recognize different types of ball transfers, including kicks, head buts, etc., and keeping a count of the specific types of ball transfers. The counts of the types of ball transfers can be used in generating statistics, for example, for an entire team, or broken down for particular team player, which are displayed in a display 602. Mobile devices 104, 106, or any personal display devices can access statistics of the sporting event, generated, for example, in the cloud service. In a non-limiting embodiment, interaction events can be categorized based on contribution to an end effect, such as assists, scoring, or even errors or penalties. The statistics can be displayed in a display 602, as well as provided to a personal display device in a manner that the user of the display device can monitor performance of preferred players of interest in the sporting event.

In a similar manner, the sporting event is basketball. The SVT can be configured for interaction recognition that includes recognizing ball transfers such as passes between players, passes that go out of bounds, and attempted shots. The SVT can be configured for interaction recognition that is for human action that is for a foul or violation. Again, the cloud service 110 can analyze the data for different types of ball transfers or fouls, which are displayed in a display 602, as well as in personal display devices for end-users to view statistics for preferred players. A display may present a Play Statistics screen 602 that lists real time player statistics, for example for personal fouls, offensive fouls, and violations.

Figure 7:
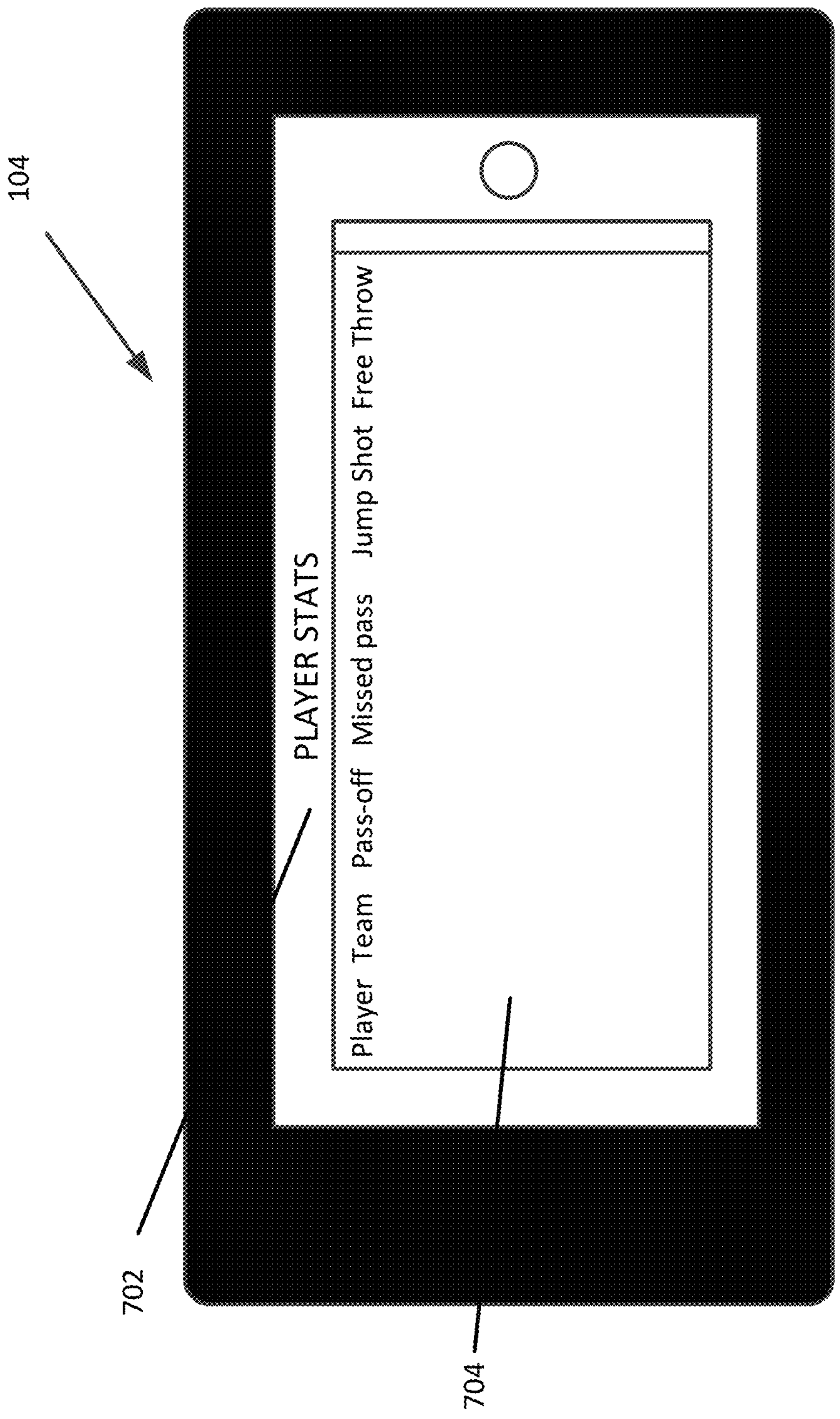
FIG. 7 is an exemplary display screen for a mobile device, in accordance with an aspect of the disclosure.

A non-limiting display for a mobile device 104 is provided in FIG. 7. The display may present a Play Statistics screen 702 that lists real time player statistics 704, for example for pass-off, missed pass, and shot: jump shot and free throw.

In a further non-limiting implementation, a database of previously stored videos of sporting events is analyzed to obtain broad statistics for particular sporting teams, or particular players for a sport, over a longer period of time than a currently played sporting event. The multiple client computers 112 having a display 602 can be used to visualize analysis of the database of stored videos.

In one non-limiting embodiment, the system and method for human action recognition can focus on human actions in a sporting event that involve penalties, especially penalties that relate to potential injuries. The system and method can be configured to recognize particular human actions that are associated with a penalty. In the embodiment, frames of a video clip for the action occurrence for the penalty can be displayed in a display 602 for review.

In one non-limiting embodiment, the system 100 includes one or more moving video cameras 130. The video cameras 130 can be mobile ground-based cameras, cameras that are movable along supporting wires, or can be cameras mounted in one or more drones that hover above the event. Frames of the video that is captured can be displayed in a display 602 for analysis of the detected human action that is recognized by the present SVT.

In one non-limiting embodiment, the system 100 involves a moving vehicle having mounted one or more outward facing video cameras 130. In such case, the video cameras 130 are in motion while capturing videos of moving humans. The Slow-Fast inference with the present SVT enables superior performance in such complex motion. A display 602 can display human motion actions that are recognized by the present SVT, such as a person riding a bicycle, scooter, or skateboard, or a person running or walking. The system and method for human action recognition can be configured to recognize human actions that may impose potential safety issues, while the vehicle is moving. Upon recognizing the human motion as a potential safety action, the present SVT is configured to inform a vehicle control system of the potential safety action.

Numerous modifications and variations of the present invention are possible in light of the above teachings. It is therefore to be understood that within the scope of the appended claims, the invention may be practiced otherwise than as specifically described herein.

As discussed above, the present SVT operates within a single modality input (RGB video). The present SVT can be expanded to utilize alternate modalities (Optical Flow, Audio) for better self supervision.

The above-disclosed SVT is evaluated for effectiveness of cross-view and motion correspondences (that compose the core of SVT) in relation to ViT backbones. The present approach can be applied under convolutional neural network (CNN). In particular, the main components (temporal attention, dynamic input sizes, and slow-fast inference) of the present SVT are designed to leverage some unique characteristics of ViTs, which could not be directly implemented with a CNN backbone. On the other hand, self-distillation and view matching, also core to SVT, can be applied to CNNs.

An issue is the significant drop in performance (top-1 accuracy) for linear evaluation in large-scale datasets (Kinetics-400 and SSv2). Particularly in SSv2, the SVT features perform poorly in the linear evaluation setting (in comparison to fine-tune setting). A key reason for this is the significant domain difference between Kinetics-400 and SSv2 (as opposed to UCF-101 and HMDB-51 which contain videos and classes more similar to Kinetics-400). The self-supervised training phase of SVT uses Kinetics-400 only, and the SSv2 experiments use that representation for linear evaluation. Self-supervised training can be performed using the SSv2 dataset itself, which can reveal insights on representations learned by the SVT.

Figure 8:
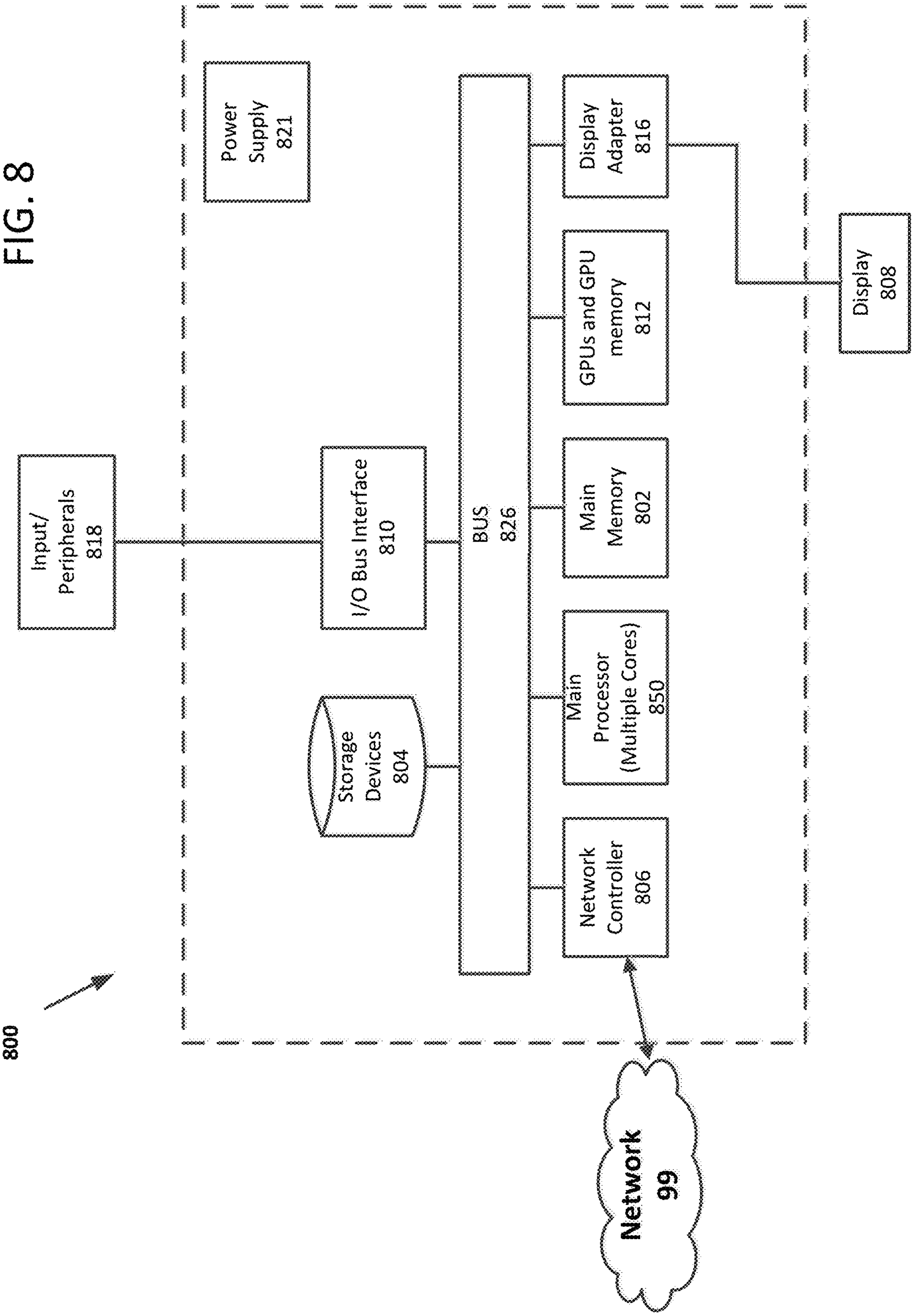
FIG. 8 is a block diagram for an exemplary computer system implementation for the SVT, in accordance with exemplary aspects of the disclosure.

FIG. 8 is a block diagram illustrating an example computer system for implementing the machine learning training and inference methods according to an exemplary aspect of the disclosure. As mentioned above, training of the present SVT was performed NVIDIA-A100 GPUs. The GPU Ampere A100 graphics card is manufactured on 7 nm incorporating 54 billion transistors, 6912 CUDA cores, and 40 GB of super-fast memory; of the HBM2E type with a bandwidth that can reach 1555 GB/s.

The computer system 800 may be an AI workstation running a microcomputer operating system, for example Ubuntu Linux OS, Windows, a version of Unix OS, or Mac OS. The computer system 800 may include one or more central processing units (CPU) 850 having multiple cores. The computer system 800 may include a graphics board 812 having multiple GPUs, each GPU having GPU memory. The graphics board 812 may perform many of the mathematical operations of the disclosed machine learning methods. The computer system 800 includes main memory 802, typically random access memory RAM, which contains the software being executed by the processing cores 850 and GPUs 812, as well as a non-volatile storage device 804 for storing data and the software programs. Several interfaces for interacting with the computer system 800 may be provided, including an I/O Bus Interface 810, Input/Peripherals 818 such as a keyboard, touch pad, mouse, Display Adapter 816 and one or more Displays 808, and a Network Controller 806 to enable wired or wireless communication through a network 99. The interfaces, memory and processors may communicate over the system bus 826. The computer system 800 includes a power supply 821, which may be a redundant power supply.

In some embodiments, the computer system 800 may include a CPU and a graphics card, such as the A100 by NVIDIA, in which the GPUs have multiple CUDA cores. In some embodiments, the computer system 800 may include a machine learning engine 812.

The invention claimed is:

1. A method of training a video transformer, using machine learning circuitry, for human action recognition in a video, comprising:

sampling, in a sampling component, video clips with varying temporal resolutions in global views, by sampling the video clips at a first frame rate and a second frame rate. wherein the second frame rate is different from the first frame rate;

sampling, in the sampling component, the video clips from different spatiotemporal windows in local views;

matching, via the machine learning circuitry, the global and local views in a framework of student-teacher networks to learn cross-view correspondence between local and global views by performing local-to-global spatiotemporal view matching, and to learn motion correspondence between varying temporal resolutions by performing global-to-global spatiotemporal view matching between the video clips sampled at the first frame rate and at the second frame rate; and displaying, via a display device, each video clip in a manner that emphasizes attention to the recognized human action, wherein the motion and cross-view correspondences involve varying spatial and temporal resolutions, and the matching includes a dynamic positional encoding of the video clips.

2. The method of claim 1, wherein the matching comprises:

randomly selecting one global view and passing the selected global view through the teacher network to generate a target;

passing other global and local views through the student network to learn the cross- view correspondences and the motion correspondences;

updating student network weight parameter values by matching the student local and global views to the target generated by the teacher network; and predicting target features using a video transformer having separate space-time attention and a multilayer perceptron.

3. The method of claim 2, wherein the student network processes the local and global views to produce feature vectors, and the feature vectors are matched to the target through a loss consisting of a motion correspondence loss and a cross-view correspondence loss.

4. The method of claim 1, wherein during each training step, the method includes updating weight parameter values of the student network via backpropagation while updating weight parameter values of the teacher as an exponential moving average of the student weight parameter values.

5. The method of claim 1, wherein the varying spatial and temporal resolutions results in variable spatial and temporal input tokens, and the dynamic positional encoding of the video clips includes:

using a separate positional encoding vector for spatial and temporal dimensions and fixing these vectors to a maximum resolution across each dimension; and varying the positional encoding vectors through interpolation to account for missing spatial or temporal tokens at lower frame rate or spatial size.

6. The method of claim 1, wherein the video is of a sporting event, the method further comprises:

analyzing the video for predetermined human actions;

recognizing the predetermined human actions among the video clips;

displaying, via the display device, selected video clips in which the predetermined human actions are recognized with the emphasis on the attention to the predetermined human actions.

7. The method of claim 6, wherein the predetermined human actions include ball transfer actions, the method further comprises:

recognizing the ball transfer actions in the video clips;

displaying, via the display device, video clips in which the ball transfer actions are recognized in a manner that emphasizes attention to the ball transfer actions.

8. The method of claim 7, further comprising:

generating, via processing circuitry, statistics for players in the sporting event based on the recognized ball transfer actions; and displaying, via the display device, the generated statistics in the display of a mobile device.

9. The method of claim 1, wherein the video is captured by one or more cameras in a vehicle while the vehicle is in motion, the method further comprises:

analyzing the video for a predetermined human motion;

recognizing the predetermined human motion as potential safety action; and informing a vehicle control system of the potential safety action.

10. The method of claim 9, wherein the predetermined human movement is a person riding a bicycle, the method further comprises:

recognizing the motion of the person riding a bicycle as potential safety action; and informing the vehicle control system of the potential safety action.

11. A system for human action recognition in a video, comprising:

processing circuitry configured to sample video clips of a video with varying temporal resolutions in global views, by sampling the video clips at a first frame rate and a second frame rate, wherein the second frame rate is different from the first frame rate, and sample the video clips from different spatiotemporal windows in local views; machine learning circuitry configured to match the global and local views in a framework of student-teacher networks to learn cross-view correspondence between local and global views by performing local-to- global spatiotemporal view matching, and to learn motion correspondence between varying temporal resolutions by performing global-to-global spatiotemporal view matching between the video clips sampled at the first frame rate and at the second frame rate; and a display device for displaying each video clip in a manner that emphasizes attention to the recognized human action, wherein the motion and cross-view correspondences involve varying spatial and temporal resolutions, and the matching includes a dynamic positional encoding of the video clips.

12. The system of claim 11, wherein the machine learning circuitry is further configured to randomly select one global view and pass the selected global view through the teacher network to generate a target;

pass other global and local views through the student network to learn the cross-view correspondences and the motion correspondences;

update student network weight parameter values by matching the student local and global views to the target generated by the teacher network; and predict target features using a video transformer having separate space-time attention and a multilayer perceptron.

13. The system of claim 12 wherein the student network processes the local and global views to produce feature vectors, and the feature vectors are matched to the target through a loss consisting of a motion correspondence loss and a cross-view correspondence loss.

14. The system of claim 11, wherein the machine learning circuitry is further configured to update weight parameter values of the student network via backpropagation while updating weight parameter values of the teacher as an exponential moving average of the student weight parameter values.

15. The system of claim 11, wherein the varying spatial and temporal resolutions results in variable spatial and temporal input tokens, wherein the machine learning circuitry is further configured to use a separate positional encoding vector for spatial and temporal dimensions and fixing these vectors to a maximum resolution across each dimension; and vary the positional encoding vectors through interpolation to account for missing spatial or temporal tokens at lower frame rate or spatial size.

16. The system of claim 11, wherein the video is of a sporting event, wherein the machine learning circuitry is further configured to analyze the video for predetermined human actions; and recognize the predetermined human actions among the video clips; and the display device displaying selected video clips in which the predetermined human actions are recognized with the emphasis on the attention to the predetermined human actions.

17. The system of claim 16, wherein the predetermined human actions include ball transfer actions, wherein the machine learning circuitry is further configured to recognize the ball transfer actions in the video clips, wherein the processing circuitry is further configured to generate statistics for players in the sporting event based on the recognized ball transfer actions; and the system further comprises a display device of a mobile device displaying the generated statistics.

18. The system of claim 11, further comprising:

at least one camera mounted in a vehicle, wherein the video is captured by the at least one camera while the vehicle is in motion, wherein the machine learning circuitry is further configured to uniformly sample two clips of the video, one with high spatial but low temporal resolution, and a second with low spatial but high temporal resolution;

pass the two clips through a single network to generate two different feature vectors;

combining the two feature vectors to obtain a joint vector;

recognize the predetermined human motion as potential safety action; and inform a control system of the vehicle of the potential safety action.

19. A non-transitory computer readable storage medium storing program code, which when executed by a computer having a CPU and a machine learning engine, perform a method comprising:

sampling video clips with varying temporal resolutions in global views, by sampling the video clips at a first frame rate and a second frame rate, wherein the second frame rate is different from the first frame rate;

sampling the video clips from different spatiotemporal windows in local views;

matching, via the machine learning engine, the global and local views in a framework of student-teacher networks to learn cross-view correspondence between local and global views by performing local-to-global spatiotemporal view matching, and to learn motion correspondence between varying temporal resolutions by performing global-to-global spatiotemporal view matching between the video clips sampled at the first frame rate and at the second frame rate; and displaying each video clip in a manner that emphasizes attention to the recognized human action, wherein the motion and cross-view correspondences involve varying spatial and temporal resolutions, and the matching includes a dynamic positional encoding of the video clips.

20. The computer readable storage medium of claim 19, wherein the matching comprises:

randomly selecting one global view and passing the selected global view through the teacher network to generate a target;

passing other global and local views through the student network to learn the cross- view correspondences and the motion correspondences;

updating student network weight parameter values by matching the student local and global views to the target generated by the teacher network; and predicting target features using a video transformer having separate space-time attention and a multilayer perceptron.

* * * * *